(12) United States Patent
Revington et al.

(10) Patent No.: US 10,967,340 B2
(45) Date of Patent: Apr. 6, 2021

(54) METHOD AND DEVICE FOR IN-LINE INJECTION OF FLOCCULENT AGENT INTO A FLUID FLOW OF MATURE FINE TAILINGS

(71) Applicant: Suncor Energy Inc., Calgary (CA)

(72) Inventors: Adrian Peter Revington, Fort McMurray (CA); William Matthew Martin, Fort McMurray (CA); Jamie Eastwood, Fort McMurray (CA); Marvin Harvey Weiss, Calgary (CA)

(73) Assignee: Suncor Energy Inc., Calgary (CA)

( * ) Notice: Subject to any disclaimer, the term of this patent is extended or adjusted under 35 U.S.C. 154(b) by 0 days.

(21) Appl. No.: 16/786,137

(22) Filed: Feb. 10, 2020

(65) Prior Publication Data
US 2020/0171447 A1 Jun. 4, 2020

Related U.S. Application Data

(63) Continuation of application No. 13/699,131, filed as application No. PCT/CA2011/000601 on May 20, 2011, now abandoned.

(30) Foreign Application Priority Data

May 20, 2010 (CA) ................................ CA 2705055

(51) Int. Cl.
*B01F 5/04* (2006.01)
*B01D 21/01* (2006.01)

(52) U.S. Cl.
CPC ............ *B01F 5/0453* (2013.01); *B01F 5/048* (2013.01); *B01F 5/0463* (2013.01); *B01F 5/0471* (2013.01); *B01F 5/0475* (2013.01); *B01D 21/01* (2013.01); *Y10T 29/53* (2015.01)

(58) Field of Classification Search
CPC ...... B01D 21/01; B01F 5/0453; B01F 5/0463; B01F 5/0471; B01F 5/0475; B01F 5/048
See application file for complete search history.

(56) References Cited

U.S. PATENT DOCUMENTS

| 1,483,742 | A | * | 2/1924 | Nicol | ........................ | A23D 9/02 554/175 |
| 2,786,651 | A | * | 3/1957 | Mickle | .................. | E21B 21/065 175/206 |

(Continued)

*Primary Examiner* — Tony G Soohoo
(74) *Attorney, Agent, or Firm* — BakerHostetler

(57) ABSTRACT

A method and device for in-line injecting of flocculated agent into a fluid flow of mature fine tailings (MFT). The method includes the steps of: a) providing a fluid flow of mature fine tailings to be treated along a given channel fluidly connected to the pipeline; b) providing a source of flocculating agent; and c) introducing flocculating agent inside the fluid flow of mature fine tailings via a plurality of injection outlets for injecting the flocculating agent into the fluid flow in a dispersed manner so as to increase an exposed surface area of the injected flocculating agent and thus increase a corresponding reaction with the mature fine tailings, for an improved flocculation of said mature fine tailings, and/or other desired end results. Also disclosed is a kit with corresponding components for assembling the in-line injection device to be connected in-line with the pipeline carrying the mature fine tailings to be treated.

25 Claims, 29 Drawing Sheets

(56) References Cited

U.S. PATENT DOCUMENTS

| | | | | |
|---|---|---|---|---|
| 3,245,662 A * | 4/1966 | Booy | B29O 48/362 366/181.6 |
| 3,259,570 A * | 7/1966 | Priesing | C02F 1/54 210/727 |
| 3,319,579 A * | 5/1967 | Stack | F04D 9/06 417/179 |
| 3,642,619 A * | 2/1972 | Lo Sasso | C02F 1/5236 210/728 |
| 3,984,504 A * | 10/1976 | Pick | F16L 55/045 261/76 |
| 4,053,142 A * | 10/1977 | Johannes | B01F 5/0068 366/165.1 |
| 4,242,098 A * | 12/1980 | Braun | C09K 3/00 44/280 |
| 4,244,440 A * | 1/1981 | Matta | G10K 11/161 181/213 |
| 4,474,477 A * | 10/1984 | Smith | B01F 5/0485 261/118 |
| 4,487,553 A * | 12/1984 | Nagata | F04F 5/466 261/76 |
| 4,514,343 A * | 4/1985 | Cramer | B01F 3/04588 210/221.2 |
| 4,702,844 A * | 10/1987 | Flesher | C02F 1/54 162/164.3 |
| 4,767,540 A * | 8/1988 | Spitzer | B01D 21/01 209/5 |
| 4,809,911 A * | 3/1989 | Ryan | B01F 5/0405 239/124 |
| 5,183,335 A * | 2/1993 | Lang | B01F 5/045 210/738 |
| 5,205,647 A * | 4/1993 | Ricciardi | B01F 5/0684 366/162.2 |
| 5,733,462 A * | 3/1998 | Mallon | C02F 1/5245 210/728 |
| 5,793,831 A * | 8/1998 | Tsiklauri | G21D 5/16 376/317 |
| 5,843,320 A * | 12/1998 | Huang | C08F 291/00 210/723 |
| 5,925,714 A * | 7/1999 | Larson | C08F 2/32 524/310 |
| 5,951,955 A * | 9/1999 | Flieg | C01F 7/0653 210/734 |
| 5,985,992 A * | 11/1999 | Chen | C02F 1/14 524/814 |
| 5,993,670 A * | 11/1999 | Knauer | B01F 5/0453 210/136 |
| 6,077,441 A * | 6/2000 | Luke | B01D 21/01 210/712 |
| 6,386,751 B1 * | 5/2002 | Wootan | C02F 1/74 366/170.3 |
| 7,504,445 B2 * | 3/2009 | Collin | A01C 7/004 523/132 |
| 7,901,128 B2 * | 3/2011 | Gehrke | B01F 5/0485 366/162.4 |
| 2001/0003291 A1 * | 6/2001 | Uematsu | B01F 5/0618 137/888 |
| 2003/0021182 A1 * | 1/2003 | Illy | B01F 3/026 366/165.5 |
| 2004/0036185 A1 * | 2/2004 | Garcia | B01F 5/048 261/76 |
| 2005/0036921 A1 * | 2/2005 | Nagasawa | B01F 5/046 422/130 |
| 2005/0281133 A1 * | 12/2005 | Surjaatmadja | B01F 9/0007 366/168.1 |
| 2006/0175721 A1 * | 8/2006 | Cincotta | B01F 5/0077 261/124 |
| 2009/0200688 A1 * | 8/2009 | Cincotta | F28O 3/08 261/76 |

* cited by examiner

METHOD AND DEVICE FOR IN-LINE INJECTION OF FLOCCULENT AGENT INTO A FLUID FLOW OF MATURE FINE TAILINGS

CROSS-REFERENCE TO RELATED APPLICATIONS

This application is a continuation of and claims priority to U.S. patent application Ser. No. 13/699,131, filed on Mar. 29, 2013, which is a National Stage of International Patent Application PCT/CA2011/000601, filed on May 20, 2011, which claims priority to foreign Patent Application CA 2,705,055, filed on May 20, 2010, the contents of which are incorporated herein by reference in their entireties.

FIELD OF THE INVENTION

The present invention relates to an injection method. More particularly, the present invention relates to a method and to a corresponding device for in-line injection of flocculated agent into a fluid flow of mature fine tailings.

BACKGROUND OF THE INVENTION

Oil sand fine tailings have become a technical, operational, environmental, economic and public policy issue.

Oil sand tailings are generated from hydrocarbon extraction process operations that separate the valuable hydrocarbons from oil sand ore. All commercial hydrocarbon extraction processes use variations of the Clark Hot Water Process in which water is added to the oil sands to enable the separation of the valuable hydrocarbon fraction from the oil sand minerals. The process water also acts as a carrier fluid for the mineral fraction. Once the hydrocarbon fraction is recovered, the residual water, unrecovered hydrocarbons and minerals are generally referred to as "tailings".

The oil sand industry has adopted a convention with respect to mineral particle sizing. Mineral fractions with a particle diameter greater than 44 microns are referred to as "sand". Mineral fractions with a particle diameter less than 44 microns are referred to as "fines". Mineral fractions with a particle diameter less than 2 microns are generally referred to as "clay", but in some instances "clay" may refer to the actual particle mineralogy. The relationship between sand and fines in tailings reflects the variation in the oil sand ore make-up, the chemistry of the process water and the extraction process.

Conventionally, tailings are transported to a deposition site generally referred to as a "tailings pond" located close to the oil sands mining and extraction facilities to facilitate pipeline transportation, discharging and management of the tailings. Due to the scale of operations, oil sand tailings ponds cover vast tracts of land and must be constructed and managed in accordance with regulations. The management of pond location, filling, level control and reclamation is a complex undertaking given the geographical, technical, regulatory and economic constraints of oil sands operations.

Each tailings pond is contained within a dyke structure generally constructed by placing the sand fraction of the tailings within cells or on beaches. The process water, unrecovered hydrocarbons, together with sand and fine minerals not trapped in the dyke structure flow into the tailings pond. Tailings streams initially discharged into the ponds may have fairly low densities and solids contents, for instance around 0.5-10 wt %.

In the tailings pond, the process water, unrecovered hydrocarbons and minerals settle naturally to form different strata. The upper stratum is primarily water that may be recycled as process water to the extraction process. The lower stratum contains settled residual hydrocarbon and minerals which are predominately fines. This lower stratum is often referred to as "mature fine tailings" (MFT). Mature fine tailings have very slow consolidation rates and represent a major challenge to tailings management in the oil sands industry.

The composition of mature fine tailings is highly variable. Near the top of the stratum the mineral content is about 10 wt % and through time consolidates up to 50 wt % at the bottom of the stratum. Overall, mature fine tailings have an average mineral content of about 30 wt %. While fines are the dominant particle size fraction in the mineral content, the sand content may be 15 wt % of the solids and the clay content may be up to 75 wt % of the solids, reflecting the oil sand ore and extraction process. Additional variation may result from the residual hydrocarbon which may be dispersed in the mineral or may segregate into mat layers of hydrocarbon. The mature fine tailings in a pond not only has a wide variation of compositions distributed from top to bottom of the pond but there may also be pockets of different compositions at random locations throughout the pond.

Mature fine tailings behave as a fluid-like colloidal material. The fact that mature fine tailings behave as a fluid significantly limits options to reclaim tailings ponds. In addition, mature fine tailings do not behave as a Newtonian fluid, which makes continuous commercial scale treatments for dewatering the tailings all the more challenging. Without dewatering or solidifying the mature fine tailings, tailings ponds have increasing economic and environmental implications over time.

There are some methods that have been proposed for disposing of or reclaiming oil sand tailings by attempting to solidify or dewater mature fine tailings. If mature fine tailings can be sufficiently dewatered so as to convert the waste product into a reclaimed firm terrain, then many of the problems associated with this material can be curtailed or completely avoided. As a general guideline target, achieving a solids content of 75 wt % for mature fine tailings is considered sufficiently "dried" for reclamation.

One known method for dewatering MFT involves a freeze-thaw approach. Several field trials were conducted at oil sands sites by depositing MFT into small, shallow pits that were allowed to freeze over the winter and undergo thawing and evaporative dewatering the following summer. Scale up of such a method would require enormous surface areas and would be highly dependent on weather and season. Furthermore, other restrictions of this setup were the collection of release water and precipitation on the surface of the MFT which discounted the efficacy of the evaporative drying mechanism.

Some other known methods have attempted to treat MFT with the addition of a chemical to create a thickened paste that will solidify or eventually dewater.

One such method, referred to as "consolidated tailings" (CT), involves combining mature fine tailings with sand and gypsum. A typical consolidated tailings mixture is about 60 wt % mineral (balance is process water) with a sand to fines ratio of about 4 to 1, and about 600 to 1000 ppm of gypsum. This combination can result in a non-segregating mixture when deposited into the tailings ponds for consolidation. However, the CT method has a number of drawbacks. It relies on continuous extraction operations for a supply of sand, gypsum and process water. The blend must be tightly controlled. Also, when consolidated tailings mixtures are less than 60 wt % mineral, the material segregates with a portion of the fines returned to the pond for reprocessing when settled as mature fine tailings. Furthermore, the geotechnical strength of the deposited consolidated tailings requires containment dykes and, therefore, the sand required in CT competes with sand used for dyke construction until extraction operations cease. Without sand, the CT method cannot treat mature fine tailings.

Another method conducted at lab-scale sought to dilute MFT preferably to 10 wt % solids before adding Percol LT27A or 156. Though the more diluted MFT showed faster settling rates and resulted in a thickened paste, this dilution-dependent small batch method could not achieve the required dewatering results for reclamation of mature fine tailings.

Some other methods have attempted to use polymers or other chemicals to help dewater MFT. However, these methods have encountered various problems and have been unable to achieve reliable results. When generally considering methods comprising chemical addition followed by tailings deposition for dewatering, there are a number of important factors that should not be overlooked.

Of course, one factor is the nature, properties and effects of the added chemicals. The chemicals that have shown promise up to now have been dependent on oil sand extraction by-products, effective only at lab-scale or within narrow process operating windows, or unable to properly and reliably mix, react or be transported with tailings. Some added chemicals have enabled thickening of the tailings with no change in solids content by entrapping water within the material, which limits the water recovery options from the deposited material. Some chemical additives such as gypsum and hydrated lime have generated water runoff that can adversely impact the process water reused in the extraction processes or dried tailings with a high salt content that is unsuitable for reclamation.

Another factor is the chemical addition technique. Known techniques of adding sand or chemicals often involve blending materials in a tank or thickener apparatus. Such known techniques have several disadvantages including requiring a controlled, homogeneous mixing of the additive in a stream with varying composition and flows which results in inefficiency and restricts operational flexibility. Some chemical additives also have a certain degree of fragility, changeability or reactivity that requires special care in their application.

Another factor is that many chemical additives can be very viscous and may exhibit non-Newtonian fluid behaviour. Several known techniques rely on dilution so that the combined fluid can be approximated as a Newtonian fluid with respect to mixing and hydraulic processes. Mature fine tailings, however, particularly at high mineral or clay concentrations, demonstrates non-Newtonian fluid behaviour. Consequently, even though a chemical additive may show promise as a dewatering agent in the lab or small scale batch trials, it is difficult to repeat performance in an up-scaled or commercial facility. This problem was demonstrated when attempting to inject a viscous polymer additive into a pipe carrying MFT. The main MFT pipeline was intersected by a smaller side branch pipe for injecting the polymer additive. For Newtonian fluids, one would expect this arrangement to allow high turbulence to aid mixing. However, for the two non-Newtonian fluids, the field performance with this mixing arrangement was inconsistent and inadequate. There are various reasons why such mixing arrangements encounter problems. When the additive is injected in such a way, it may have a tendency to congregate at the top or bottom of the MFT stream depending on its density relative to MFT and the injection direction relative to the flow direction. For non-Newtonian fluids, such as Bingham fluids, the fluid essentially flows as a plug down the pipe with low internal turbulence in the region of the plug. Also, when the chemical additive reacts quickly with the MFT, a thin reacted region may form on the outside of the additive plug thus separating unreacted chemical additive and unreacted MFT.

Inadequate mixing can greatly decrease the efficiency of the chemical additive and even short-circuit the entire dewatering process. Inadequate mixing also results in inefficient use of the chemical additives, some of which remain unmixed and unreacted and cannot be recovered. Known techniques have several disadvantages including the inability to achieve a controlled, reliable or adequate mixing of the chemical additive as well as poor efficiency and flexibility of the process.

Still another factor is the technique of handling the oil sand tailings after chemical addition. If oil sand tailings are not handled properly, dewatering may be decreased or altogether prevented. In some past trials, handling was not managed or controlled and resulted in unreliable dewatering performance. Some techniques such as in CIBA's Canadian patent application No. 2,512,324 (SCHAFFER et al.) have attempted to simply inject the chemical into the pipeline without a methodology to reliably adapt to changing oil sand tailings compositions, flow rates, hydraulic properties or the nature of particular chemical additive. Relying solely on this ignores the complex nature of mixing and treating oil sand tailings and significantly hampers the flexibility and reliability of the system. When the chemical addition and subsequent handling have been approached in such an uncontrolled, trial-and-error fashion, the dewatering performance has been unachievable.

Yet another factor is the technique of handling or treating the MFT prior to chemical addition. MFT is drawn up by pumps or dredging equipment from tailings ponds and preferably sent via pipeline to the dewatering treatment area. The tailings ponds, however, may contain a variety of materials that could disrupt the MFT dewatering process. For instance, in the raw MFT there may be mats of bitumen, particularly in the cold winter months. There may also be other extraneous debris such as pieces of wood, glass, plastic, metal or natural organic material that can be entrained with the MFT as it is taken from the pond. Such unwanted materials can interfere with the MFT process equipment and chemistry.

Given the significant inventory and ongoing production of MFT at oil sands operations, there is a need for techniques and advances that can enable MFT drying for conversion into reclaimable landscapes.

Known to the applicant are the following publications and patent documents, namely: OWEN, A. T. et al. "*Using turbulent pipe flow to study the factors affecting polymer-bridging flocculation of mineral systems*", International Journal of Mineral Processing, Vol. 87, Issues 3-4, Jul. 2, 2008; VRALE et al., "*Rapid Mixing in Water*," Jour. AWWA, January, 1971; WO 2002/079099 A1 (BRANNING, L.); WO 2009/009887 A1 (BOZAK, R. et al.); and U.S. Pat. No. 5,839,828 (GLANVILLE, R.).

However, none of these prior art documents seem to teach, illustrate or even suggest a solution for inefficient injection and mixing of liquid and polymer with mature fine tailings (MFT) which typically leave unused polymer in the drying cell area. This is particularly disadvantageous in that it is both expensive and adversely affects the process. Therefore, it would be very useful to provide a new method or a corresponding device for faster and more efficient mixing of a flocculated agent, such as a liquid polymer for example, with mature fine tailings (MFT). Indeed, it would be very useful to provide a new method or device which would enable a lower polymer usage for the same quantity of MFT as compared to an un-optimized design which is typical to most conventional systems being used. It would also be very useful to provide for a new device which would be of very low maintenance, and which could be easily fabricated in-house.

Hence, in light of the aforementioned, there is a need for a new method or device of treating MFT which would be able to overcome or at least minimize some of the above-discussed prior art concerns.

SUMMARY OF THE INVENTION

An object of the present invention is to provide a device, which by virtue of its design and components, satisfies some of the above-mentioned needs and is thus an improvement over other related devices and/or methods known in the prior art.

In accordance with the present invention, the above object is achieved, as will be easily understood, with a device such as the one briefly described herein, and such as the one exemplified in the accompanying drawings. Preferably, the device is an "add-on" to a pipeline carrying mature fine tailings (MFT), in the form of an injection device, intended to be connected "in-line" with the pipeline.

More particularly, the present invention relates to an injection device for inline-injection of flocculating agent into a fluid flow of a pipeline of mature fine tailings in order to promote flocculation of said mature fine tailings, the injection device comprising:
- a main inlet for receiving the fluid flow;
- a main channel along which the fluid flow entering the inlet is allowed to travel;
- a main outlet for releasing the fluid flow; and
- a complementary conduit, disposed co-annularly with respect to the main channel, and configured for receiving flocculating agent from a feed inlet different from the main inlet, the complementary conduit having a plurality of injection outlets disposed co-annularly about the main outlet for injecting flocculating agent into the fluid flow exiting the main outlet, the injection outlets being shaped and sized, and each having an orifice substantially smaller than that of the feed inlet so as to increase dispersion of the flocculating agent about the main outlet in order to improve mixing of the fluid flow with said flocculating agent via an increased exposed surface area of the flocculating agent.

According to a preferred embodiment, the present invention also relates to an injection device for use with a lateral pipe fitting of a pipeline of mature fine tailings, the lateral pipe fitting having a substantially y-joint arrangement including a main line along which a fluid flow of mature fine tailings is intended to travel, and a corresponding branch line, the injection device comprising:
- an abutment flange for abutting against a distal end of the branch line;
- a supporting body projecting from the abutment flange inwardly towards the main line, the supporting body having an internal conduit for conveying flocculated agent to be introduced into the fluid flow via a corresponding distal extremity intersecting said fluid flow of mature fine tailings; and
- a plurality of injection outlets provided on the distal extremity of the supporting body, and through which flocculated agent is injected, the injection outlets being shaped and sized, and each having an orifice substantially smaller than that of the internal conduit so as to increase dispersion of the flocculating agent about the injection outlets in order to improve mixing of the fluid flow with said flocculating agent via an increased exposed surface area of the flocculating agent provided by the plurality of injection outlets.

According to another aspect of the present invention, there is also provided a kit with components for assembling the above-mentioned injection device.

Indeed, according to a preferred embodiment, the present invention relates to a kit for assembling an injection device for inline-injection of flocculating agent into a fluid flow of a pipeline of mature fine tailings in order to promote flocculation of said mature fine tailings, the kit comprising:
- a tee joint having first, second and third sections, each section being provided with a corresponding orifice being fluidly connected to each other;
- a first flange mountable about the first section of the tee joint, said first flange being configured for mounting the assembled injection device onto a first section of the pipeline;
- a second flange mountable about the second section of the tee joint, said second flange being configured for mounting the assembled injection device onto a second section of the pipeline;
- a third flange mountable about the third section of the tee joint, said third flange being configured for connecting the assembled injection device to a source of flocculated agent;
- a reducer mountable onto the first section of the tee joint so as to be positioned inside the tee joint, the reducer having an inlet and an outlet, the inlet of the reducer being concentrically mountable about the orifice of the first section of the tee joint, the cross-sectional area of the reducer being reduced from its inlet to its outlet;
- an inner pipe mountable onto the second section of the tee joint so as to be positioned inside the tee joint, the inner pipe having an inlet and an outlet, the inlet of the inner pipe being connectable to the outlet of the reducer, the outlet of the inner pipe being concentrically mountable about the orifice of the second section of the tee joint, the inner pipe being cooperable with the second section of the tee joint for defining a plurality of injection outlets about the outlet of the inner pipe so that flocculated agent coming from the third section of the tee joint be injected in a dispersed manner through said injection outlets and into a fluid flow of mature fine tailings traveling through the reducer and the inner pipe.

According to yet another aspect of the present invention, there is also provided a conversion kit including the above-mentioned device and/or components.

According to yet another aspect of the present invention, there is also provided a set of components for interchanging with components of above-mentioned device and/or kit.

According to yet another aspect of the present invention, there is also provided a method for assembling components of the above-mentioned kit and/or set.

According to yet another aspect of the present invention, there is also provided a method of using the above-mentioned device, kit, set and/or components thereof.

According to yet another aspect of the present invention, there is also provided a corresponding pipeline carrying mature fine tailings, the pipeline having been assembled with the above-mentioned device, conversion kit, set and/or method(s).

According to yet another aspect of the present invention, there is also provided a method of manufacturing the above-mentioned device, corresponding kit and/or conversion set.

According to yet another aspect of the present invention, there is also provided a method of introducing flocculated agent into a fluid flow of mature fine tailings.

More particularly, the present invention also relates to a method of in-line injection of flocculating agent into a pipeline of mature fine tailings in order to promote flocculation of said mature fine tailings, the method comprising the steps of:

a) providing a fluid flow of mature fine tailings to be treated along a given channel fluidly connected to the pipeline;

b) providing a source of flocculating agent; and c) introducing flocculating agent inside the fluid flow of mature fine tailings via a plurality of injection outlets for injecting the flocculating agent into the fluid flow in a dispersed manner so as to increase an exposed surface area of the injected flocculating agent and thus increase a corresponding reaction with the mature fine tailings, for an improved flocculation of said mature fine tailings.

The objects, advantages and other features of the present invention will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

Figure 1:
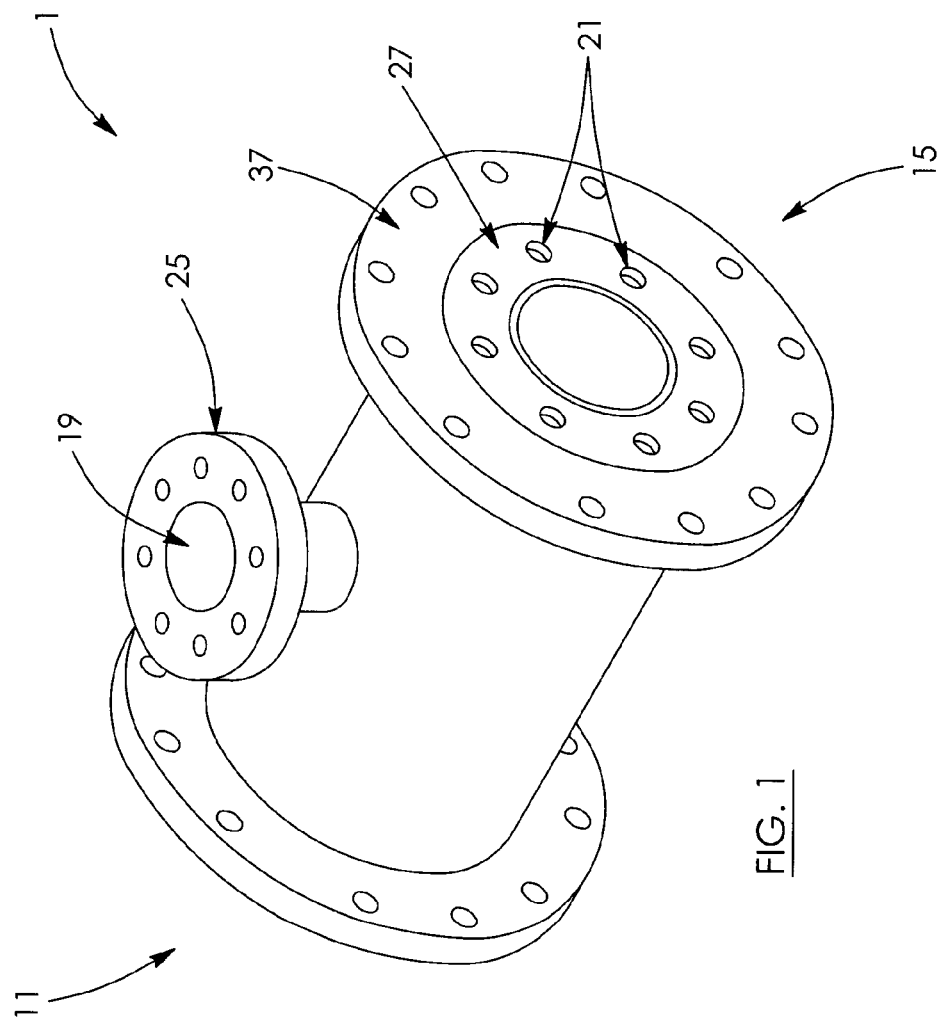
FIG. 1 is a perspective view of an injection device according to a preferred embodiment of the present invention.
Figure 2:
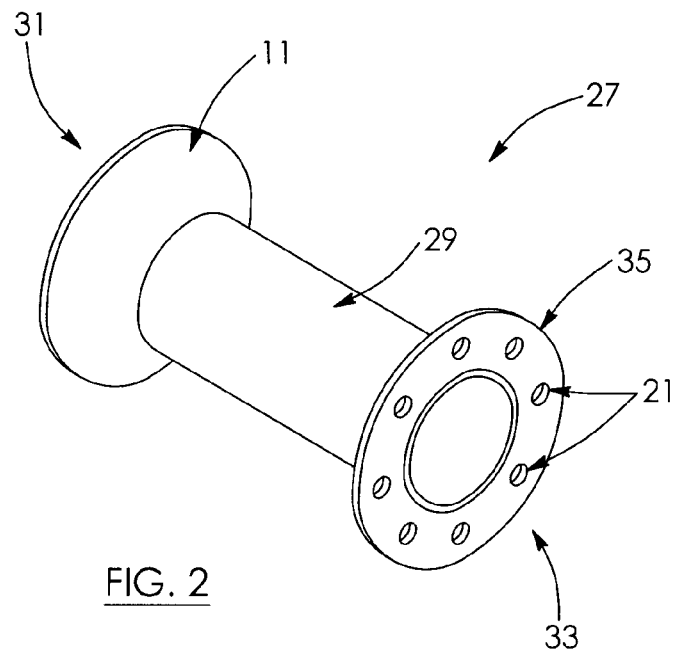
FIG. 2 is a perspective view of an inner component of the injection device shown in FIG. 1.

In the following description, the same numerical references refer to similar elements. The embodiments, geometrical configurations, materials mentioned and/or dimensions shown in the figures are preferred, given for exemplification purposes only.

Moreover, although the present invention was primarily designed for injecting flocculated agent, such as liquid polymer for example, into a fluid flow of a pipeline carrying mature fine tailings (MFT) for example, it may be used with other types of substance(s) and/or liquid(s), for other purposes, and in other fields, as apparent to a person skilled in the art. For this reason, expressions such as "injecting", "flocculated", "agent", "liquid, "polymer", "pipeline", "MFT", etc. used herein should not be taken as to limit the scope of the present invention and includes all other kinds of pipelines, cylinders, items and/or applications with which the present invention could be used and may be useful.

Moreover, in the context of the present invention, the expressions "device", "kit", "unit", "apparatus", "mechanism", "assembly", "spool", "system", "set" and any other equivalent expression and/or compound word thereof known in the art will be used interchangeably. Furthermore, the same applies for any other mutually equivalent and/or complementary expressions, such as "pipeline", "cylinder", "conduit", "channel", and "pipe", as well as "additive", "solution" and "agent" for example, or even "flocculated", "chemical" and "reactive", as well as "co-annularly", "co-axially", "concentrically", "conjointly" and "complementary", as also apparent to a person skilled in the art. The same can be said about other similar expressions such as "processing", "mixing", "treating", solidifying", "dewatering", "flocculating" and "consolidating", or even "outlet", "orifice" and "hole", as also apparent to a person skilled in the art.

In addition, although the preferred embodiment of the present invention as illustrated in the accompanying drawings comprises various components and although the preferred embodiment of the injecting device as shown consists of certain geometrical configurations as explained and illustrated herein, not all of these components and geometries are essential to the invention and thus should not be taken in their restrictive sense, i.e. should not be taken as to limit the scope of the present invention. It is to be understood that other suitable components and cooperations therein between, as well as other suitable geometrical configurations may be used for the injecting device and corresponding parts according to the present invention, as well as corresponding conversion kit or set, and/or resulting pipeline or circuit, as briefly explained herein, or as can be easily inferred herefrom, by a person skilled in the art, without departing from the scope of the present invention.

Broadly described, the present invention, as exemplified and shown in the accompanying drawings, relates to an improved method of introducing flocculating agent into a fluid flow of a pipeline carrying mature fine tailings in order to improve reaction of the flocculating agent with said mature fine tailings for an improved flocculating of the mature fine tailings, and/or corresponding resulting advantages, such as dewatering, for example. This new method of in-line injection of flocculating agent into a pipeline of mature fine tailings distinguishes itself from other known techniques in that the introduction of flocculating agent is done inside the fluid flow of mature fine tailings via a plurality of injection outlets for injecting the flocculating agent into the fluid flow in a "dispersed manner", so as to increase a wetted perimeter and thus an exposed surface area of the injected flocculating agent, in order to increase a corresponding reaction with the mature fine tailings, for improved end results. The present invention also relates to a corresponding injection device for in-line connection with the pipeline carrying the mature fine tailings, and in order to carry out the in-line injection method according to the present invention.

LIST OF NUMERICAL REFERENCES FOR SOME OF THE CORRESPONDING PREFERRED COMPONENTS ILLUSTRATED IN THE ACCOMPANYING DRAWINGS 1. injection device
3. flocculated agent
5. fluid flow
7. pipeline
9. mature fine tailings
11. main inlet
13. main channel
15. main outlet
17. complementary conduit
19. feed inlet
21. injection outlet
21c. center point (of injection outlet 21)
23. inner surface (of main conduit 13)
25. connecting flange (of feed inlet 19)
27. inner component
29. cylinder
31. first end (of cylinder 29)
33. second end (of cylinder 29)
35. ring (of cylinder 29)
37. outer component
39. sleeve
41. first end (of sleeve 39)
43. first flange (of first end 41)
45. first section (of pipeline 7)
47. second end (of sleeve 39)
49. second flange (of first end 47)
51. second section (of pipeline 7)
53. peripheral surface (of sleeve 39)
55. transitional segment
57. interface segment
59. main segment
61. longitudinal axis (of fluid flow 5)
63. tee joint
65. first section (of tee joint 63)
65a. orifice (of first section 65)
67. second section (of tee joint 63)
67a. orifice (of second section 67)
69. third section (of tee joint 63)
69a. orifice (of third section 69)
71. first flange
73. second flange
75. third flange
77. reducer
79. inlet (of reducer 77)
81. outlet (of reducer 77)
83. inner pipe
85. inlet (of inner pipe 83)
87. outlet (of inner pipe 83)
89. outer pipe
91. backing ring
93. lap ring
95. nut
97 lateral pipe fitting
99 main line (of lateral pipe fitting 97)
101 branch line (of lateral pipe fitting 97)
103 abutment flange
105 distal end (of branch line 101)

Figure 6:
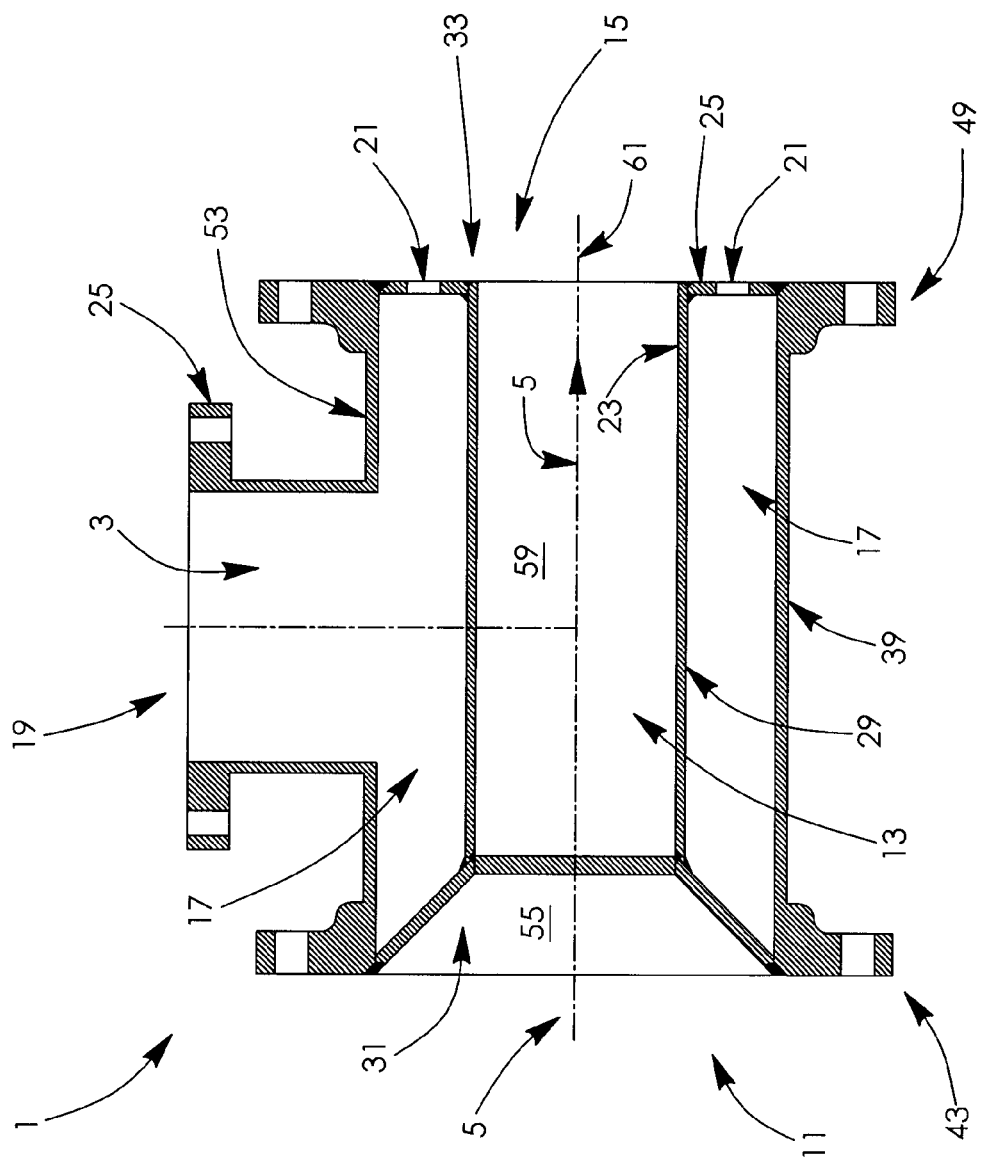
FIG. 6 is a cross-sectional view taken along line VI-VI of FIG. 4.
Figure 13:
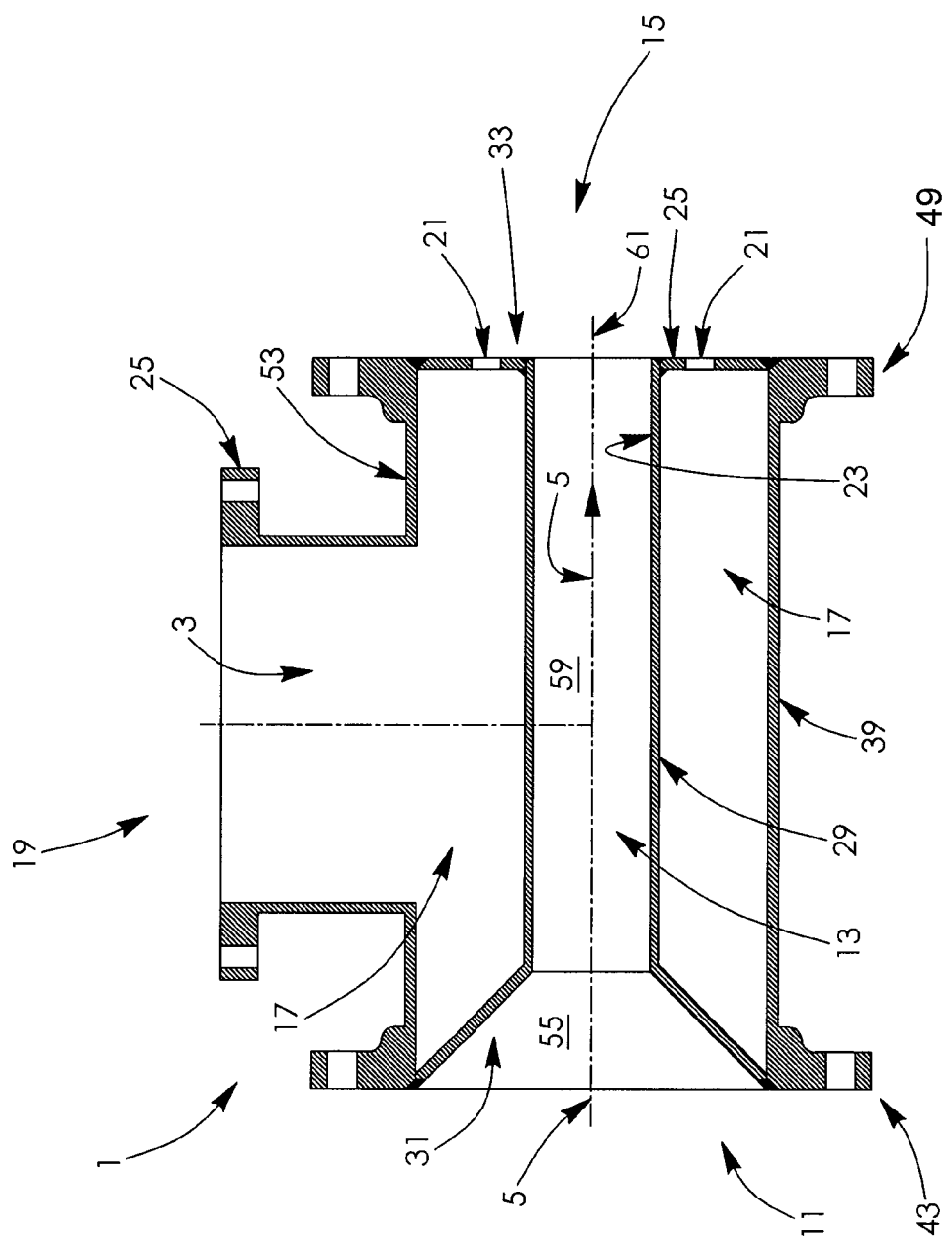
FIG. 13 is a cross-sectional view taken along line XIII-XIII of FIG. 11.
Figure 20:
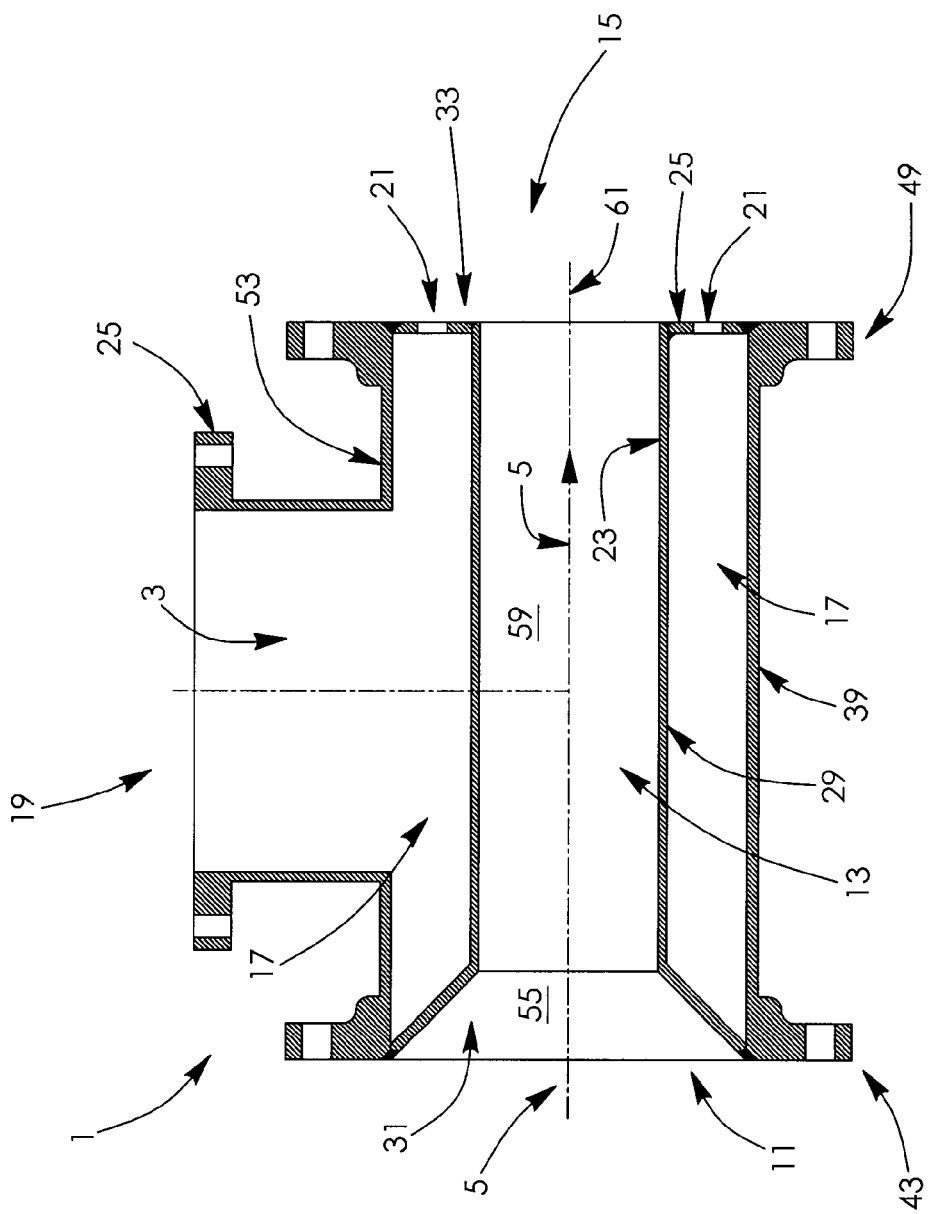
FIG. 20 is a cross-sectional view taken along line XX-XX of FIG. 18.

107 supporting body
109 internal conduit
111 distal extremity (of supporting body 107)
113 stabilizer As previously explained, and according to a preferred aspect of the present invention, there is provided an injection device (1) for in-line injection of flocculating agent (3) into a fluid flow (5) of a pipeline (7) of mature fine tailings (9) in order to promote reaction of the flocculated agent (3) with the mature fine tailings (9). As exemplified in the accompanying drawings, and more particularly in FIGS. 1-21, the injection device (1) comprises a main inlet (11), a main channel (13), a main outlet (15), and a complementary conduit (17). The main inlet (11) is intended for receiving the fluid flow (5) of the pipeline (7) carrying mature fine tailings (9), and the main channel (13) is where the fluid flow (5) entering the inlet (11) is allowed to travel. The fluid flow (5) circulating through the pipeline (7) and thus through the injection device (1) which is connected in-line to the pipeline (7) is then allowed to be released out from the main outlet (15) of the injection device (1). An innovative aspect of the injection device (1) resides namely in its complementary conduit (17), which, as better exemplified in FIGS. 6, 13 and 20, is preferably disposed co-annularly (or co-axially, conjointly, etc.) with respect to the main channel (13), and configured for receiving flocculated agent (3) from a feed inlet (19), typically different from the main inlet (11), and has a plurality of injection outlets (21) disposed about the main outlet (15) for injection flocculating agent (3) into the fluid flow (5) exiting the main outlet (15), the injection outlets (21) being shaped and sized, and each having an orifice substantially smaller than that of the feed inlet (19) so as to increase dispersion of the flocculated agent (5) about the main outlet (15) in order to improve mixing of the fluid flow (5) with said flocculated agent (3) via an increased exposed surface area of the flocculated agent (3), thus overcoming several of the drawbacks and inconveniences associated with mixing techniques associated with the prior art.

As will be explained in greater detail hereinbelow, it is worth mentioning that, according to the present invention, the injection outlets (21) for introducing the flocculating agent (3) into the fluid flow (5) of mature fine tailings (9) in a dispersed manner may be positioned at different locations, and advantageously, accordingly within the injection device (1) and/or pipeline (7) so as to benefit from certain dynamic behavior within the fluid flow (5) of the mature fine tailings (9), in order to obtain an improved reaction of the flocculating agent (3) with the mature fine tailings (9).

According to one aspect of the present invention, the injection device (1) is preferably configured so that the main inlet (11) thereof be tapered, namely so that fluid flow (5) from the pipeline (7) carrying mature fine tailings (9) entering the injection device (1) goes through a reduced cross-sectional area in order to increase the velocity of the fluid flow (5), and in turn obtain a resulting turbulence within the fluid flow (5) which could advantageously be used when the flocculating agent (3) is introduced into the fluid flow (5) in a dispersed manner, via the plurality of injection outlets (21), whether directly into such a turbulent zone of the fluid flow (5), or downstream thereof (and in some cases, even "upstream"), for optimizing the introduction, mixing and/or reaction of the flocculating agent (3) with the mature fine tailings (9).

Preferably, and as can be easily understood by a person skilled in the art, although the injection device (1) according to the present invention could be used with a main inlet (11) having a cross-sectional area which changes abruptly along the channel, for increasing rapidly the flow velocity of the mature fine tailings (9) traveling therealong, the main inlet (11) for the injection device (1) according to a preferred embodiment of the present invention is preferably gradually tapered so as to progressively increase the flow velocity of the mature fine tailings (9), while attempting to minimize pressure loss of the fluid flow (5) travelling through said transitional segment (55) given that any pressure losses throughout the pipeline (7) are cumulative. For indicative purposes only, and according to a preferred embodiment of the present invention, the taper may range anywhere between about 7 degrees and about 90 degrees, depending on the particular application(s) for which the present injection device (1) is intended for, and the desired end result(s), as apparent to a person skilled in the art.

Moreover, it is worth mentioning also that providing a tapered main inlet (11) ensures that less wear will be caused onto the given component of the injection device (1) which provides such a main inlet (11), due to the nature of the mature fine tailings (9) which would normally damage or wear out an internal component of the main inlet (11) in a much faster manner if a change in the cross-sectional area was more abrupt, as can be easily understood by a person skilled in the art.

Referring more specifically to given preferred embodiments of the present invention, as exemplified in FIGS. 1-21, there is shown how the injection outlets (21) are preferably radially positioned about the main outlet (15) of the fluid flow (5) in an equally spaced manner. More specifically, according to these particular embodiments, the injection outlets (21) are provided about a backing ring (91) at the outermost rear part of the injection device (1). According to these particular embodiments, the injection device (1) preferably comprises eight injection outlets (21), each being about ⅞ inches in diameter, with a center point (21c) for each injection outlet (21) being positioned about ⅞ inches away from an inner surface (23) of the main channel (13), as better shown in FIGS. 5, 12 and 19. However, it is worth mentioning, as can also be easily understood by a person skilled in the art, that an important aspect of the present invention resides in the manner in which the flocculated agent (3) is introduced or "dispersed" within the fluid flow (5) of the mature fine tailings (9) for increasing a proper reaction, thus, the number of injection holes (21), the cross-sectional configuration thereof, the positioning with respect to the main channel (13), and other considerations, may be changed, altered and/or modified, depending on the particular applications for which the injection device (1) is intended for, the type of fluid flow (5) with which it is used, and the desired end results. It is worth mentioning however that irrespectively of the total number of injection outlets (21), whether two, three, four, five, six, seven, eight or more, the total area of the injection outlets (21) are preferably set to be less than the total flow area of the feed inlet (19) of flocculated agent (3), thereby ensuring that the injection outlet (21) is the primary pressure drop point which jets the solution (i.e flocculating agent (3)) into the MFT, for improved mixing.

According to one preferred aspect of the present invention, and based on certain tries having been carried out for optimizing the process, the increased wetted perimeter of the flocculating agent (3) being injected out through the injection outlets (21) is preferably about 2.8. However, it is worth mentioning also that such a ratio may vary once again, depending on the particular application(s) for which the present injection device (1) is intended for, and the desired end result(s), and that, in some cases, the exposed area for the polymer when dispersed to micro drops can be much higher, as can be easily understood by a person skilled in the art (ex. using simulation modeling, etc.). Preferably also, and according to another preferred embodiment, the main channel (13) is selected so as to have an internal diameter which is about half the size of an internal diameter of the pipeline (7). Indeed, as will be better described hereinbelow, the present injection device (1) has been designed so as to facilitate assembling and/or manufacturing thereof, with standard or readily available "off-the-shelf" components, while providing for a resulting innovative injection device (1) which enables to introduce the flocculating agent (3) into the fluid flow (5) of mature fine tailings (9) in an improved manner, for improved mixing end results.

Thus, it can be appreciated that, for example, an internal diameter of the main channel (13) could be about 6 inches, or even 4 inches, for a pipeline (7) having an internal diameter of about 12 inches. Furthermore, and as can be easily understood when referring to FIGS. 1-21, the feed inlet (19) of the injection device (1) is preferably provided with a connecting flange (25) for removably connecting the feed inlet (19) to a source of flocculating agent (3), or any other type of chemical reactive intended to cooperate with the mature fine tailings (9) circulating through the pipeline (7) for a corresponding flocculation, dewatering, or any other suitable intended purpose, as can be easily understood by a person skilled in the art.

According to one preferred embodiment, the flocculating agent (3) is a liquid polymer, designed for proper reaction with the mature fine tailings (9), but any other suitable substance, agent, chemical reactive, solution, and/or the like, may be used with the injection device (1), as can be easily understood by a person skilled in the art. It is worth mentioning as is well known in the art that MFT mainly consists of water, sand and clay, in which the solids content in the MFT can range anywhere between about 15-50%. Typical injectors are essentially ineffective on MFT with a solids content greater than 30%, which is about greater or equal to about 1.22 specific gravity. However, the present injection device (1) and corresponding components (injection outlets (21), etc.) are designed to work equally well throughout the full range of MFT solids contents, and this characteristic of the injection device (1) is an important reason for its design and implementation into the MFT drying system.

Referring to FIGS. 1-21, there is shown how according to a given aspect of the present invention, the injection device (1) can be assembled using an inner component (27), and an outer component (37). The inner component (27) preferably comprises a cylinder (29) defining the main channel (13) along which the fluid flow (5) is allowed or intended to travel, the cylinder (29) having a first end (31) operatively connectable to the main inlet (11) and a second end (33) provided with a ring (35) operatively connectable to the main outlet (15), the ring (35) being provided with the injection outlets (21).

Figure 3:
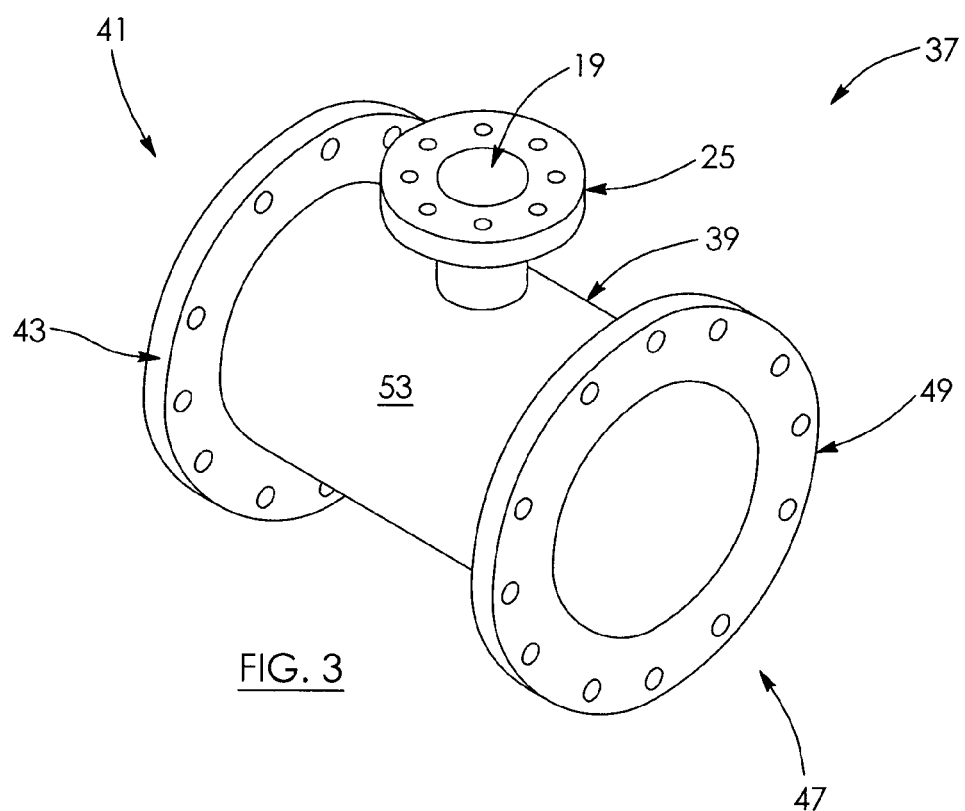
FIG. 3 is a perspective view of an outer component of the injection device shown in FIG. 1.
Figure 4:
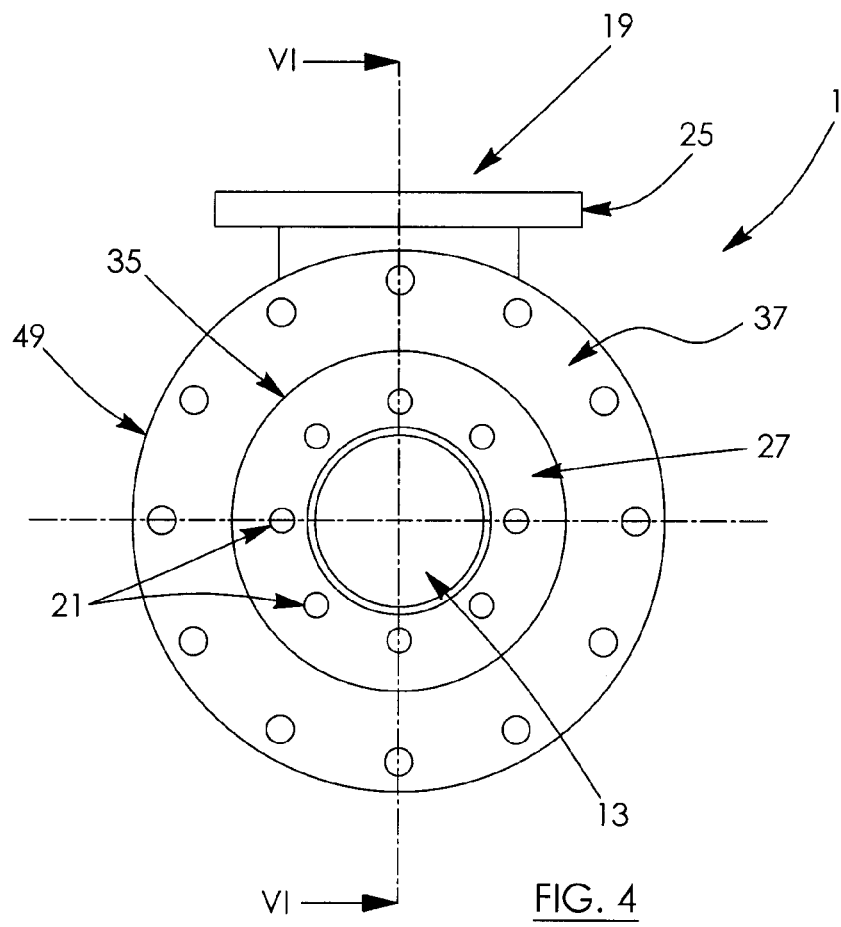
FIG. 4 is a front view of what is shown in FIG. 1.
Figure 5:
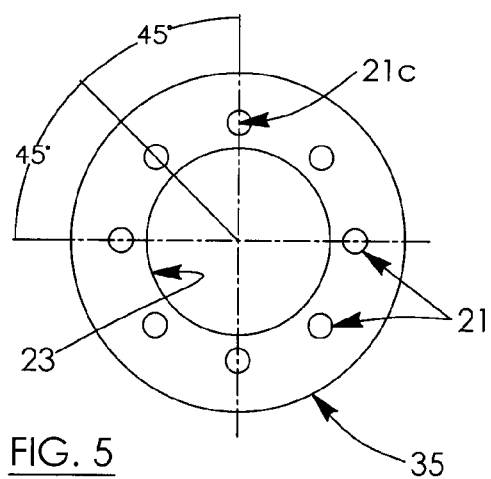
FIG. 5 is a front view of what is shown in FIG. 2.
Figure 10:
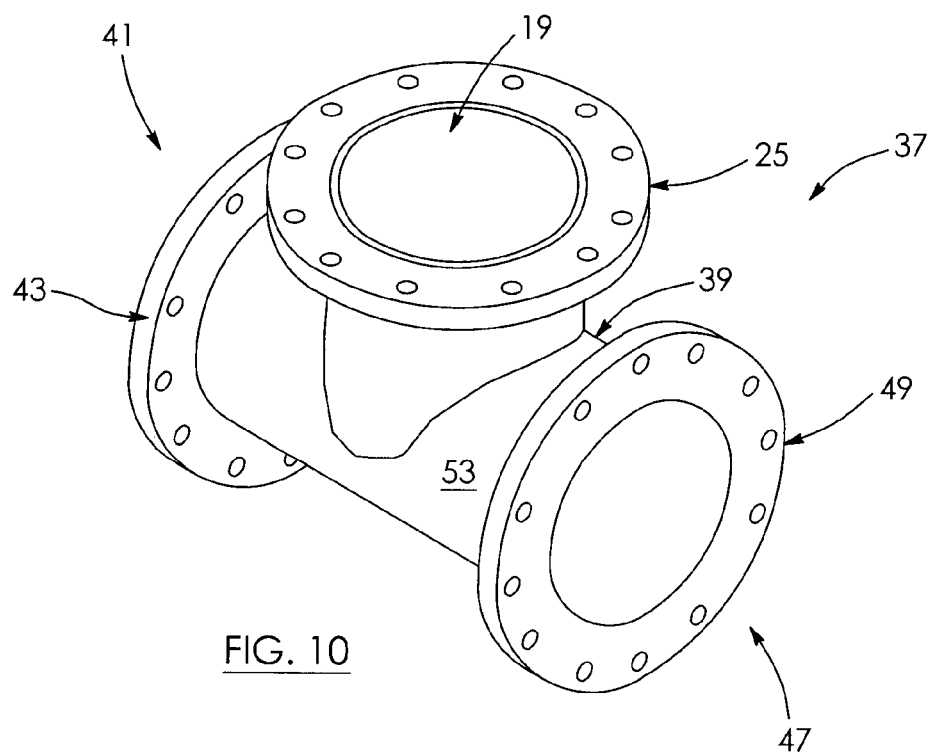
FIG. 10 is a perspective view of an outer component of the injection device shown in FIG. 8.
Figure 11:
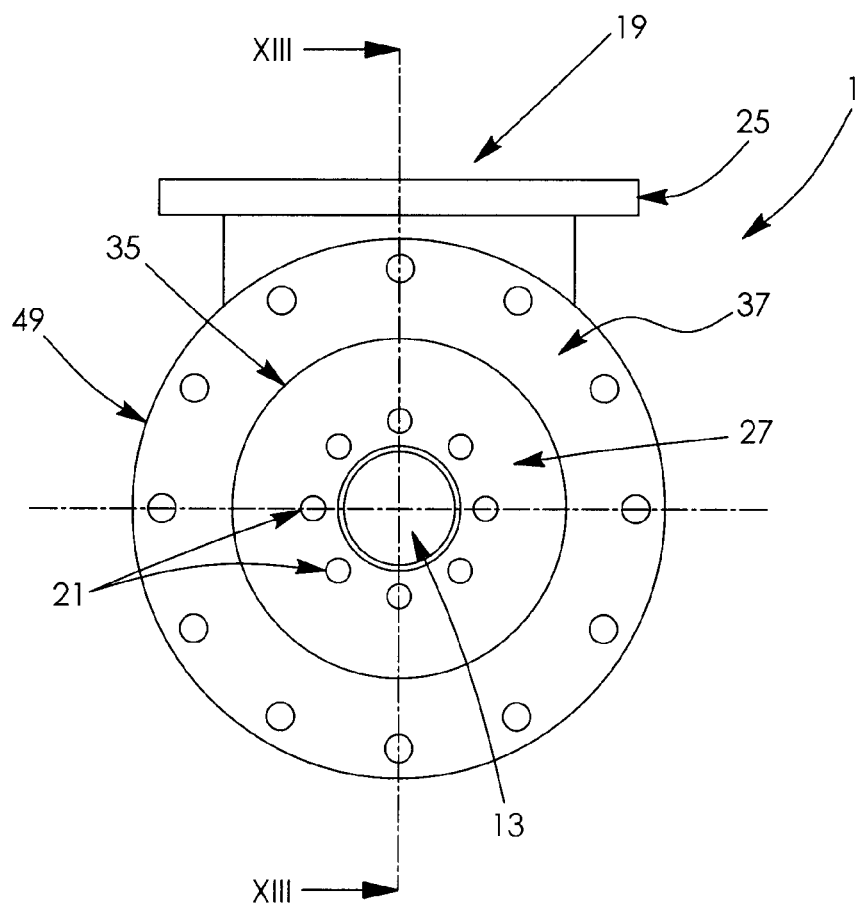
FIG. 11 is a front view of what is shown in FIG. 8.
Figure 12:
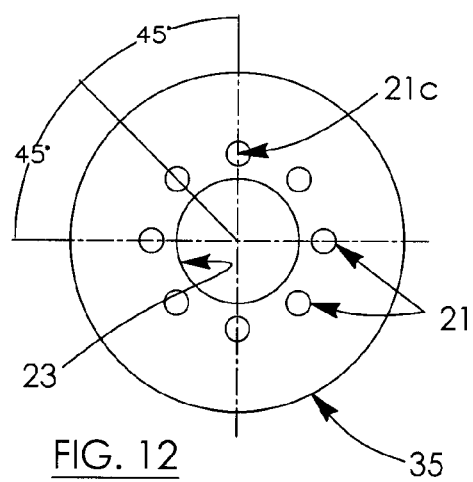
FIG. 12 is a front view of what is shown in FIG. 9.
Figure 17:
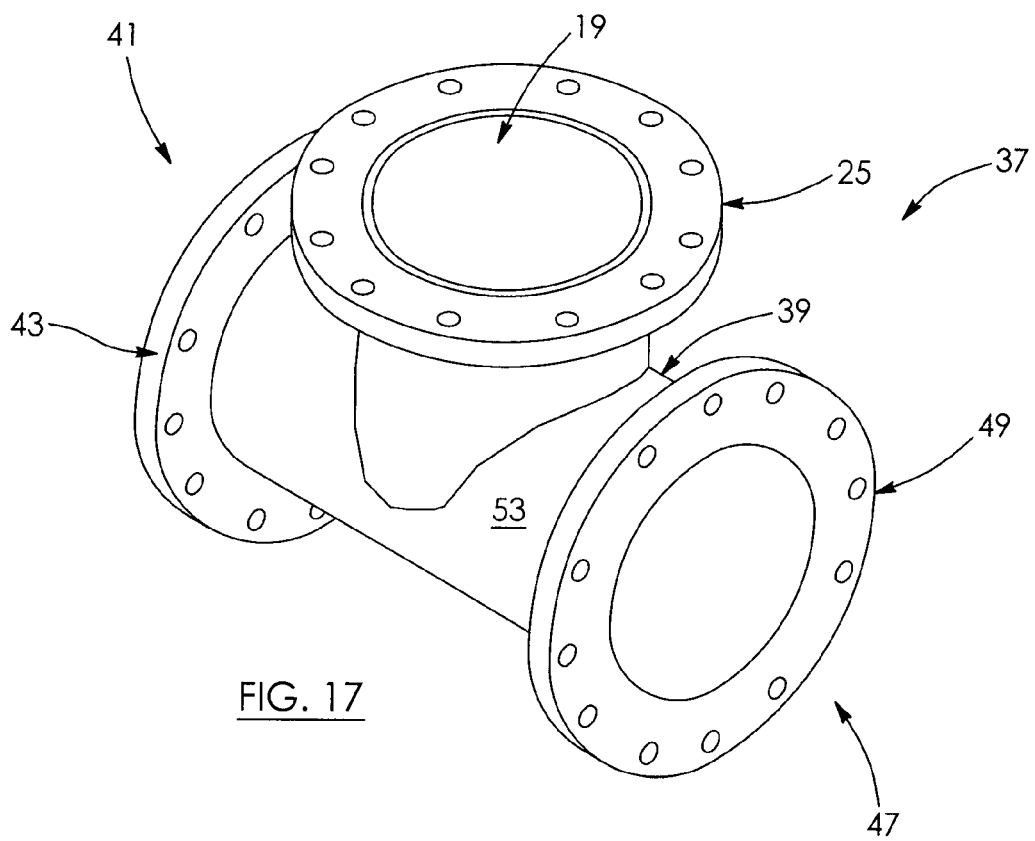
FIG. 17 is a perspective view of an outer component of the injection device shown in FIG. 15.
Figure 18:
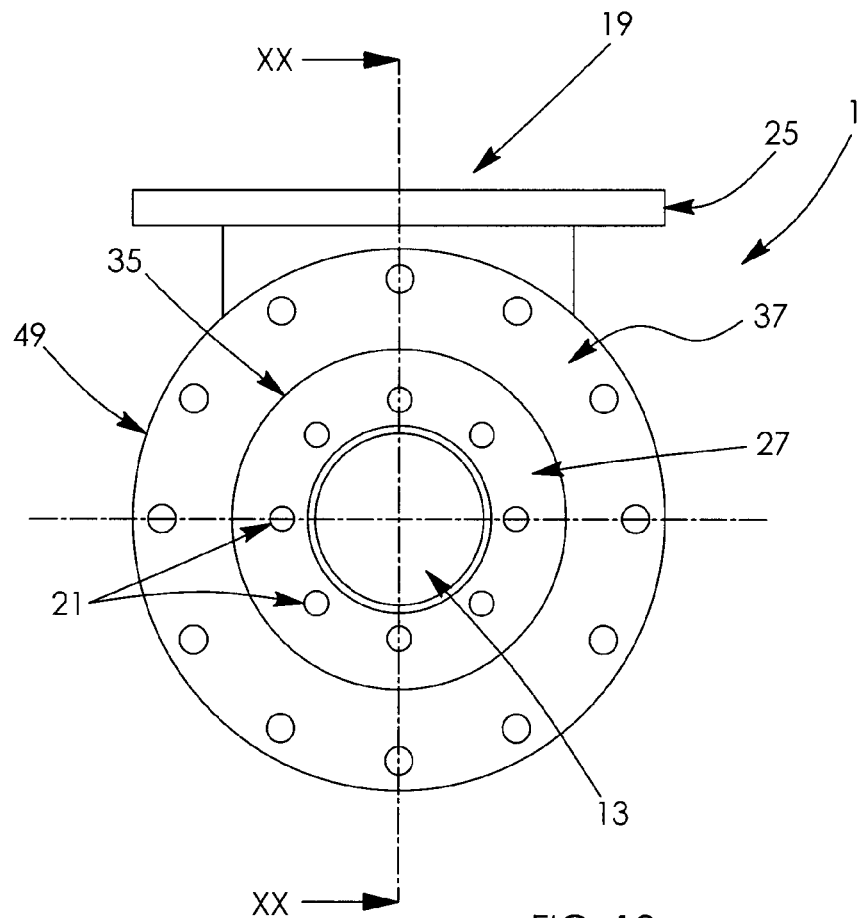
FIG. 18 is a front view of what is shown in FIG. 15.
Figure 19:
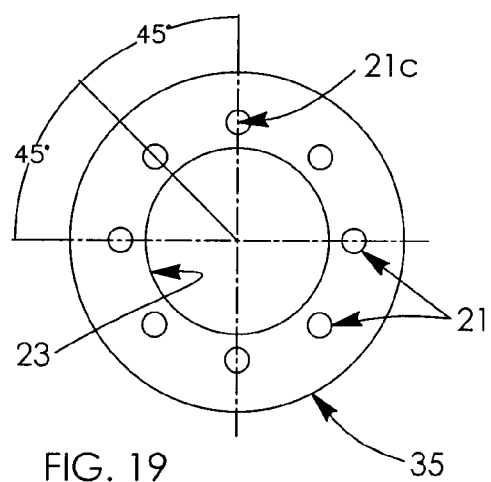
FIG. 19 is a front view of what is shown in FIG. 16.

Referring now to the outer component (37), it preferably comprises a sleeve (39) concentrically mounted about the inner component (27), the sleeve (39) having a first end (41) provided with a first flange (43) being removably connectable onto a first section (45) of the pipeline (7), and a second end (47) provided with a second flange (49) being removably connectable onto a second section (51) of the pipeline (7) for in-line connection of the injection device (1) with the pipeline (7), the outer component (37) being also provided with the feed inlet (19) projecting outwardly from a peripheral surface (53) of the sleeve (39), as better shown in FIGS. 3, 10 and 17.

Figure 7:
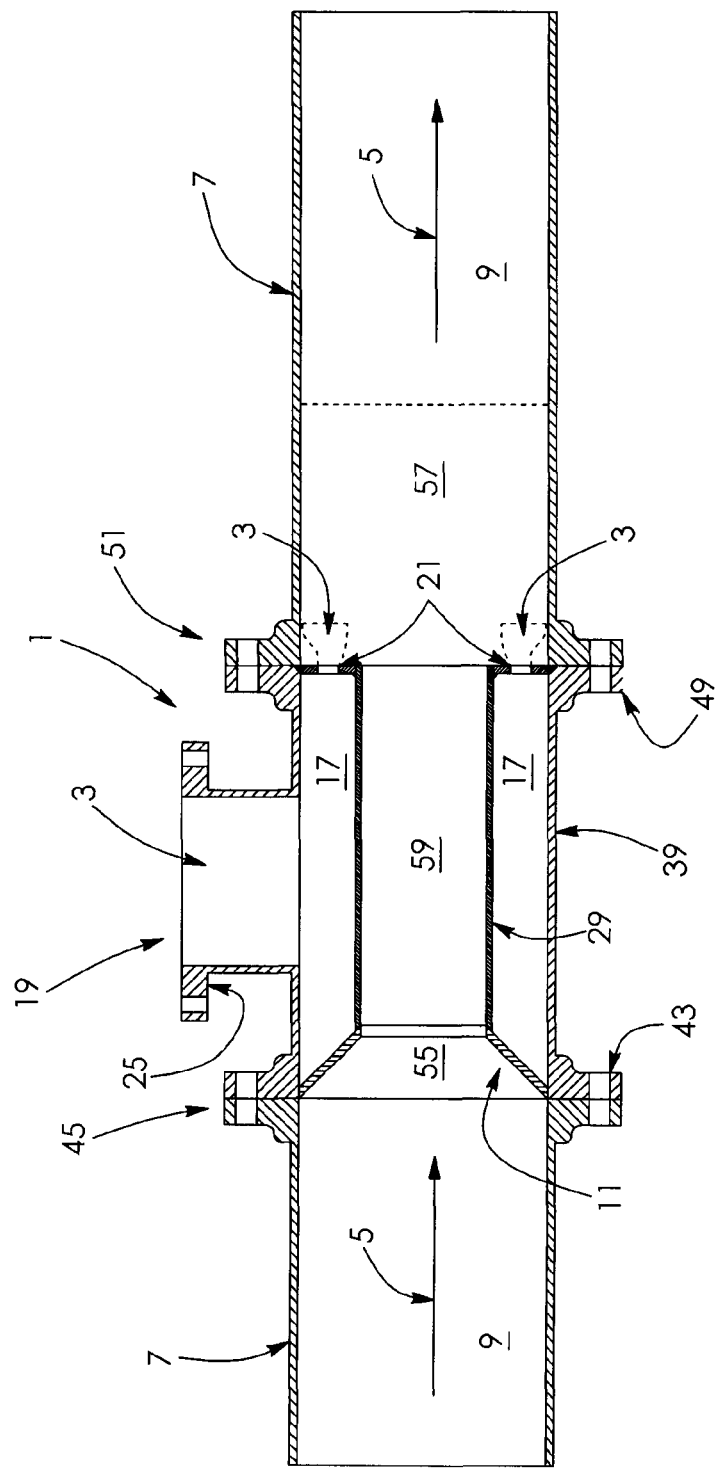
FIG. 7 is a schematic cross-sectional representation of a pipeline carrying a fluid flow of mature fine tailings and being provided with an injection device according to a preferred embodiment of the present invention.
Figure 8:
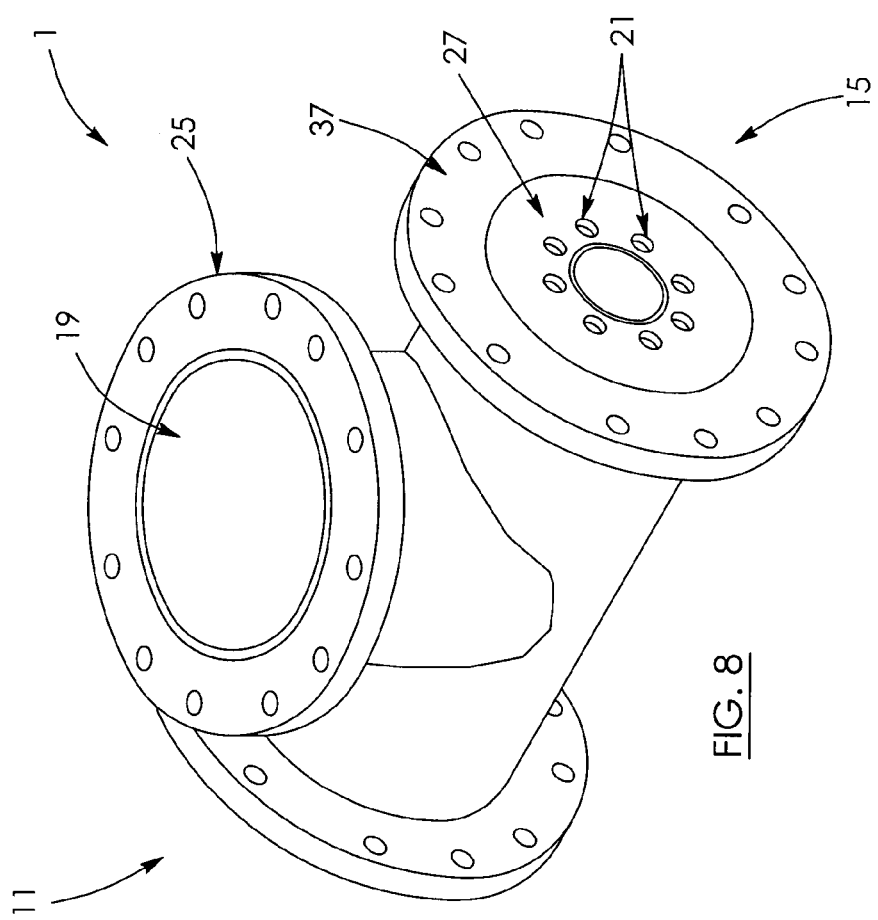
FIG. 8 is a perspective view of an injection device according to another preferred embodiment of the present invention.
Figure 9:
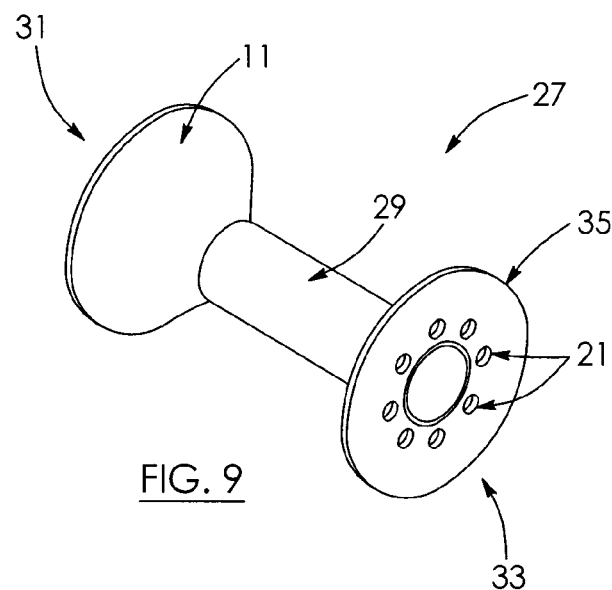
FIG. 9 is a perspective view of an inner component of the injection device shown in FIG. 8.
Figure 14:
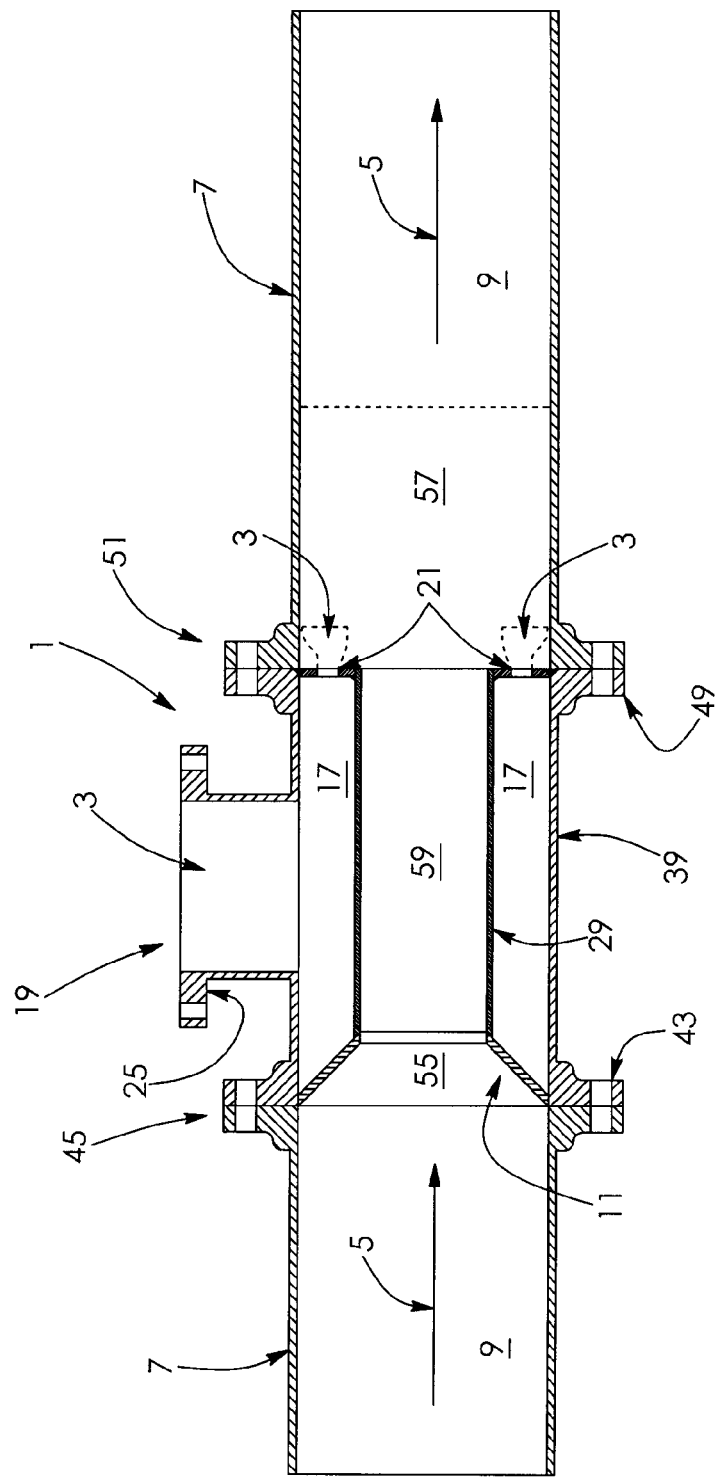
FIG. 14 is a schematic cross-sectional representation of a pipeline carrying a fluid flow of mature fine tailings and being provided with an injection device according to another preferred embodiment of the present invention.
Figure 15:
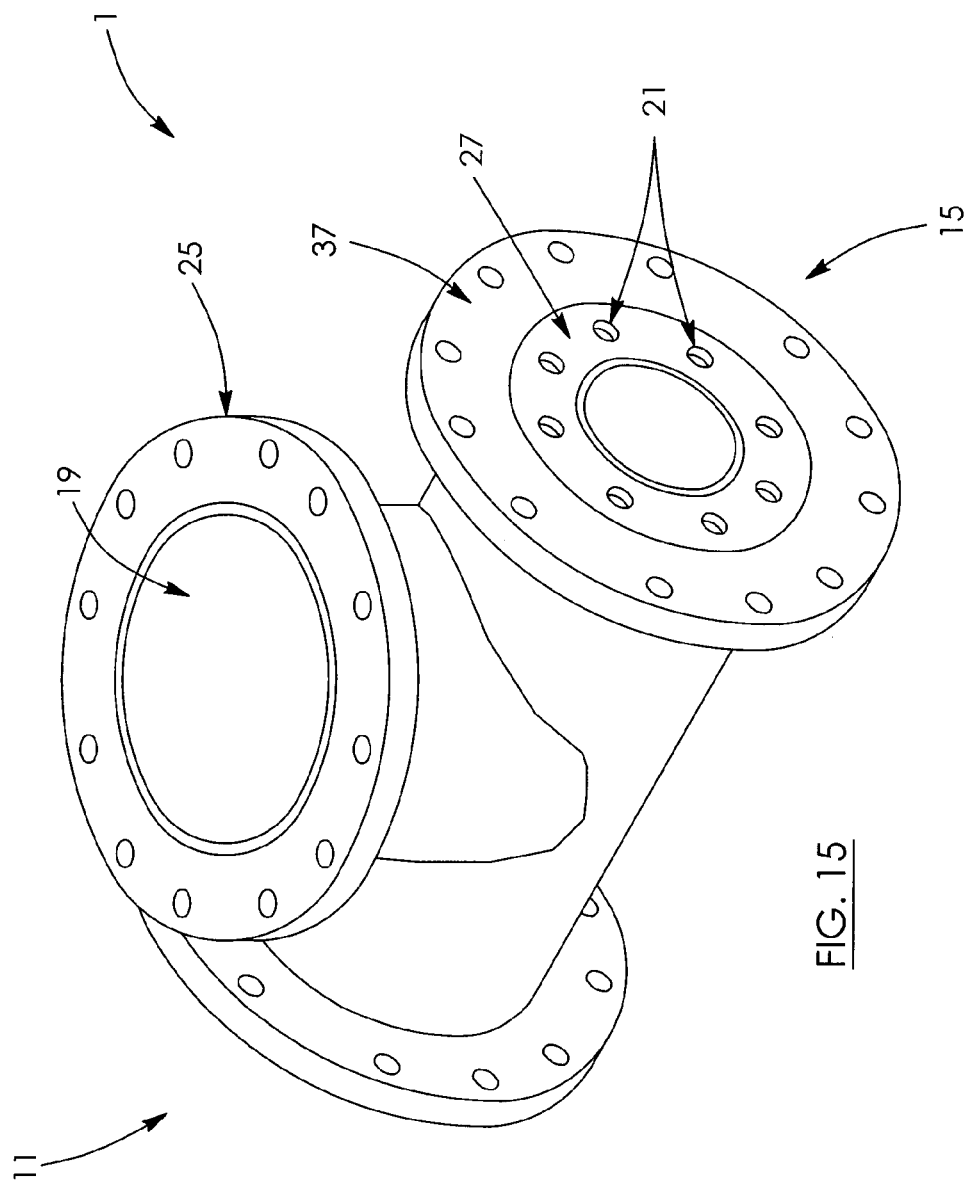
FIG. 15 is a perspective view of an injection device according to yet another preferred embodiment of the present invention.
Figure 16:
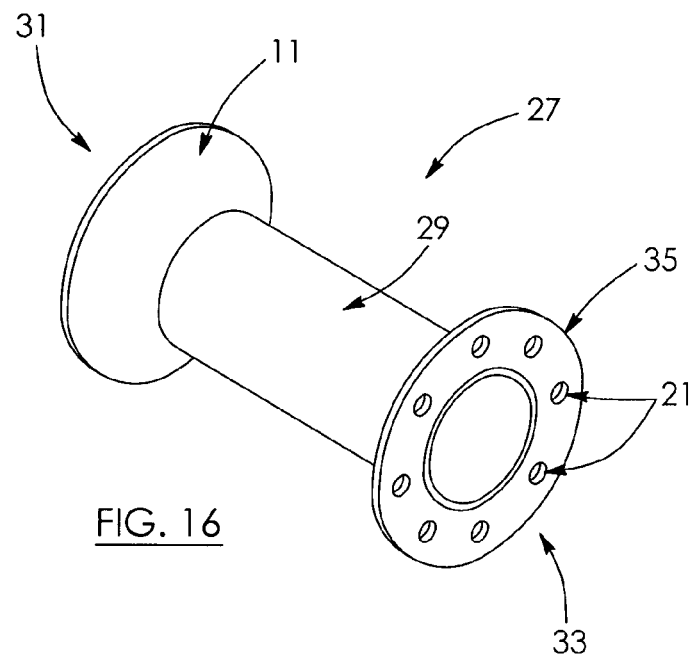
FIG. 16 is a perspective view of an inner component of the injection device shown in FIG. 15.
Figure 21:
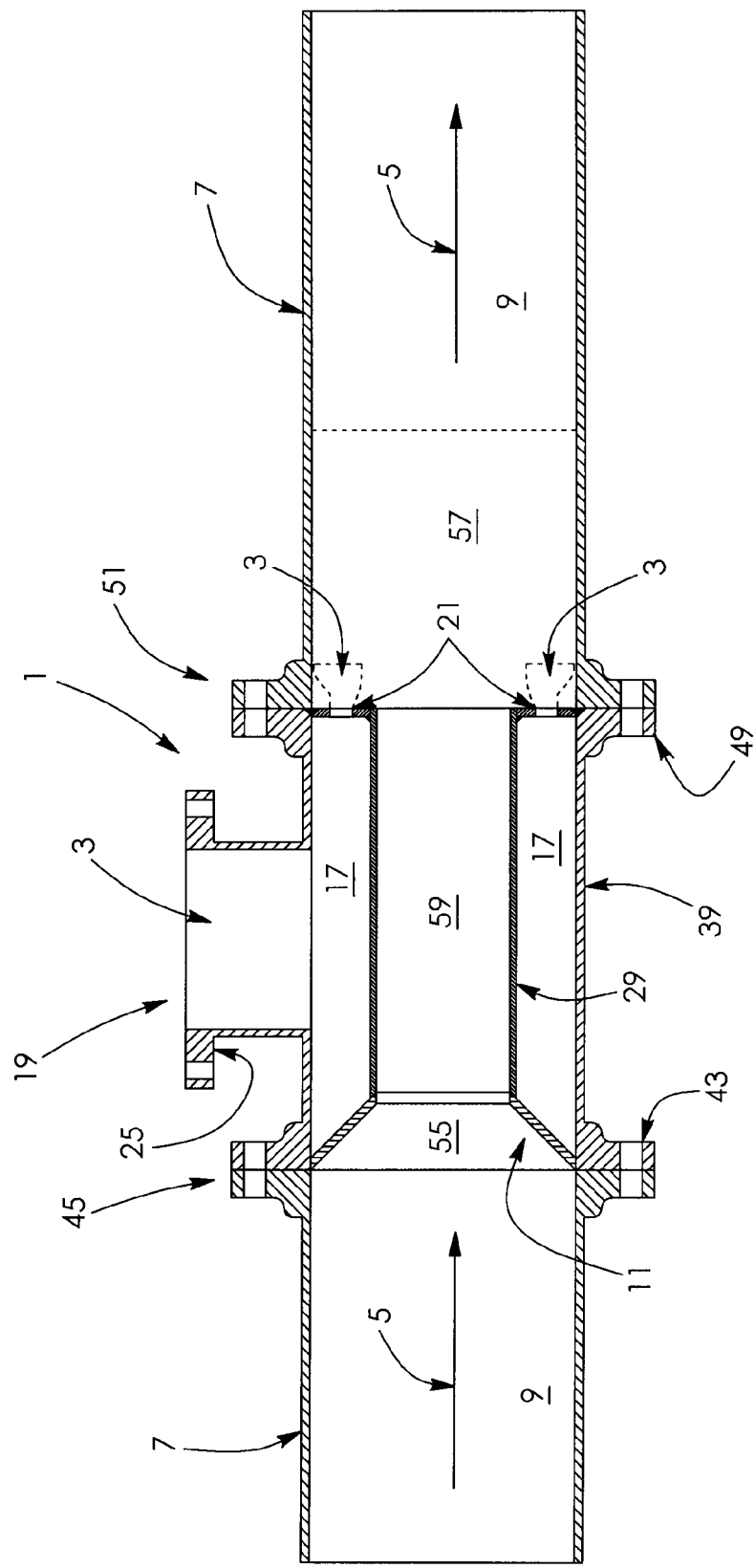
FIG. 21 is a schematic cross-sectional representation of a pipeline carrying a fluid flow of mature fine tailings and being provided with an injection device according to yet another preferred embodiment of the present invention.

As can be easily understood when referring to FIGS. 6, 13 and 20, the cylinder (29) and the sleeve (39) are preferably configured so that the complementary conduit (17) is defined thereinbetween when the outer component (37) is mounted about the inner component (27), the complementary conduit (17) being in fluid communication between the feed inlet (19) and the injection outlets (21) provided on the ring (35) of the inner component (27) so that flocculating agent (3) introduced into the complementary conduit (17) via the feed inlet (19) is injected out the injection outlets (21) of the inner component (27) so as to increase dispersion of the flocculating agent (3) within the fluid flow (5), as can be easily understood when referring to FIGS. 7, 14 and 21.

Similarly to what was described earlier, the first end (31) of the cylinder (29) of the inner component (27) is preferably tapered, in a gradual manner. Advantageously, and preferably also, the outer component (37) consists of a standard fitting, for facilitating procurement and assembling of the components of the injection device (1). For example, the first and second ends (31,33) of the cylinder (29) can respectively be welded onto the first and second ends (41,47) of the sleeve (39), as can be easily understood when referring to FIGS. 6, 13 and 20, although other suitable ways of assembling, affixing and/or securing the various components of the injection device (1) are also intended with the present invention, as can be easily understood by a person skilled in the art.

Although different variations of possible in-line injection devices (1) have been explained and illustrated in the present description, it is worth mentioning that an important aspect of the present invention resides in the provision of a new method for in-line injection of flocculating agent (3) into a pipeline (7) of mature fine tailings (9) in order to promote flocculation of said mature fine tailings (9) and obtain other resulting advantages, as can be easily understood by a person skilled in the art. The method preferably comprises the steps of: a) providing a fluid flow (5) of mature fine tailings (9) to be treated along a given channel fluidly connected to the pipeline (7); b) providing a source of flocculating agent (3); and c) introducing flocculating agent (3) inside the fluid flow (5) of mature fine tailings (9) via a plurality of injection outlets (21) for injecting the flocculating agent (3) into the fluid flow (5) in a dispersed manner so as to increase an exposed surface area of the injected flocculating agent (3) and thus increase a corresponding reaction with the mature fine tailings (9), for an improved flocculation of the mature fine tailings (9), and/or other resulting advantages. As apparent to a person skilled in the art, the manners in which this method and corresponding injection device (1) could be used are various.

For example, step c) could comprise the step of i) creating a zone of turbulence within the fluid flow (5) of mature fine tailings (9); and ii) injecting flocculating agent (3) in a dispersed manner via the plurality of injection outlets (21) within said zone of turbulence for mixing the flocculating agent (3) with the mature fine tailings (9) and further promoting flocculation of the mature fine tailings (9).

Step a) of the present invention could also comprise the step of iii) reducing the cross-sectional area of the channel along a given transitional segment (55) of the channel for increasing the flow velocity of the mature fine tailings (9) travelling through said transitional segment (55), and in turn increasing a turbulence of the fluid flow (5) exiting form the transitional segment (55), as can be easily understood when referring to FIGS. 7, 14 and 21.

Figure 33:
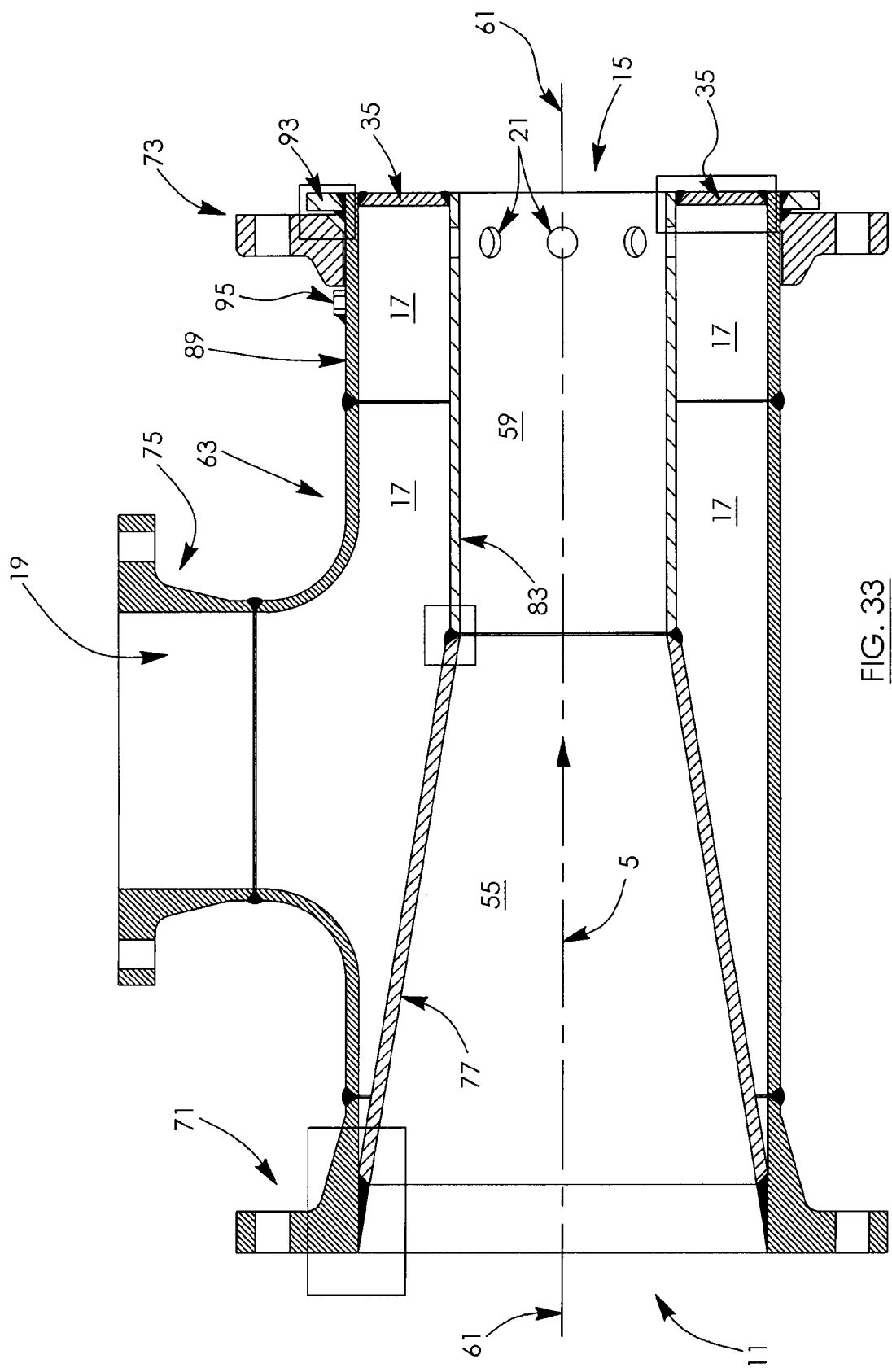
FIG. 33 is a cross-sectional view taken along line XXXIII-XXXIII of the injection device of FIG. 26.
Figure 36:
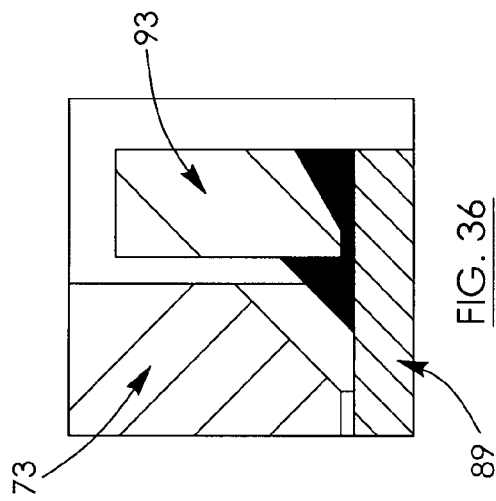
FIG. 36 is an enlarged sectional view of another portion of what is shown in FIG. 33.
Figure 37:
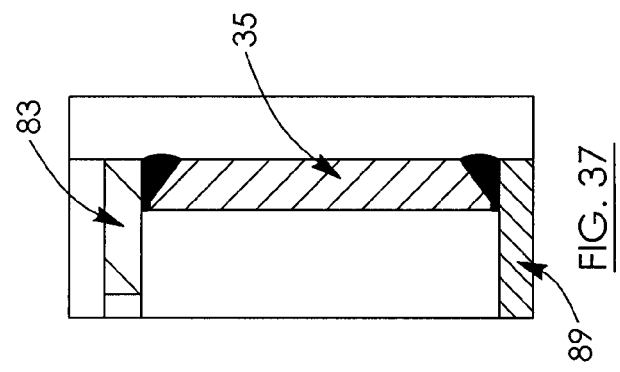
FIG. 37 is an enlarged sectional view of another portion of what is shown in FIG. 33.
Figure 34:
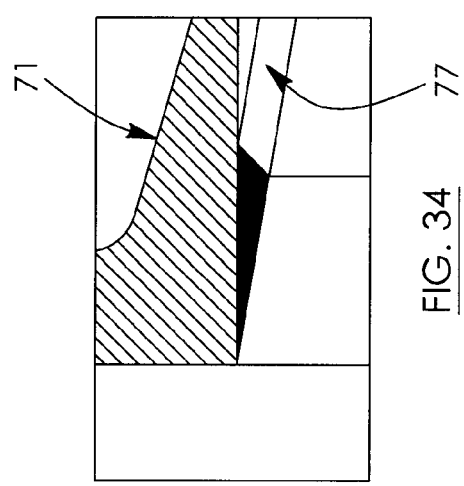
FIG. 34 is an enlarged sectional view of a portion of what is shown in FIG. 33.
Figure 35:
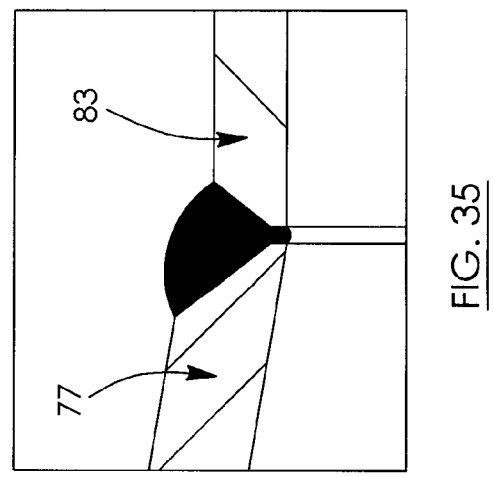
FIG. 35 is an enlarged sectional view of another portion of what is shown in FIG. 33.

Step a) of the present invention could also comprise the step of gradually reducing the cross-sectional area of the channel along a given slope, which in some of the embodiments illustrated in the accompanying drawings, preferably has a ratio of about 7 to 1, as better shown in FIG. 33 for example, so as to namely, and as previously explained, prevent a pressure loss of the fluid flow (5) travelling through said transitional segment (55).

It is worth mentioning also that step a) of the present invention could also comprise the step of iv) rapidly increasing the cross-sectional area of the channel along a given interface segment (57) of the channel for abruptly altering the flow velocity of the mature fine tailings (9) travelling through said interface segment (57) of the channel, in order to create a turbulent zone of fluid flow (5) adjacent to said interface segment (57). As can be easily understood by a person skilled in the art, this abrupt change in cross-sectional area of the fluid flow (5) is done when the fluid flow (5) exits the main channel (13) of the injection device (1) and flows back into the pipeline (7) at the second section (51) thereof, as schematically represented in FIGS. 7, 14 and 21.

Figure 38:
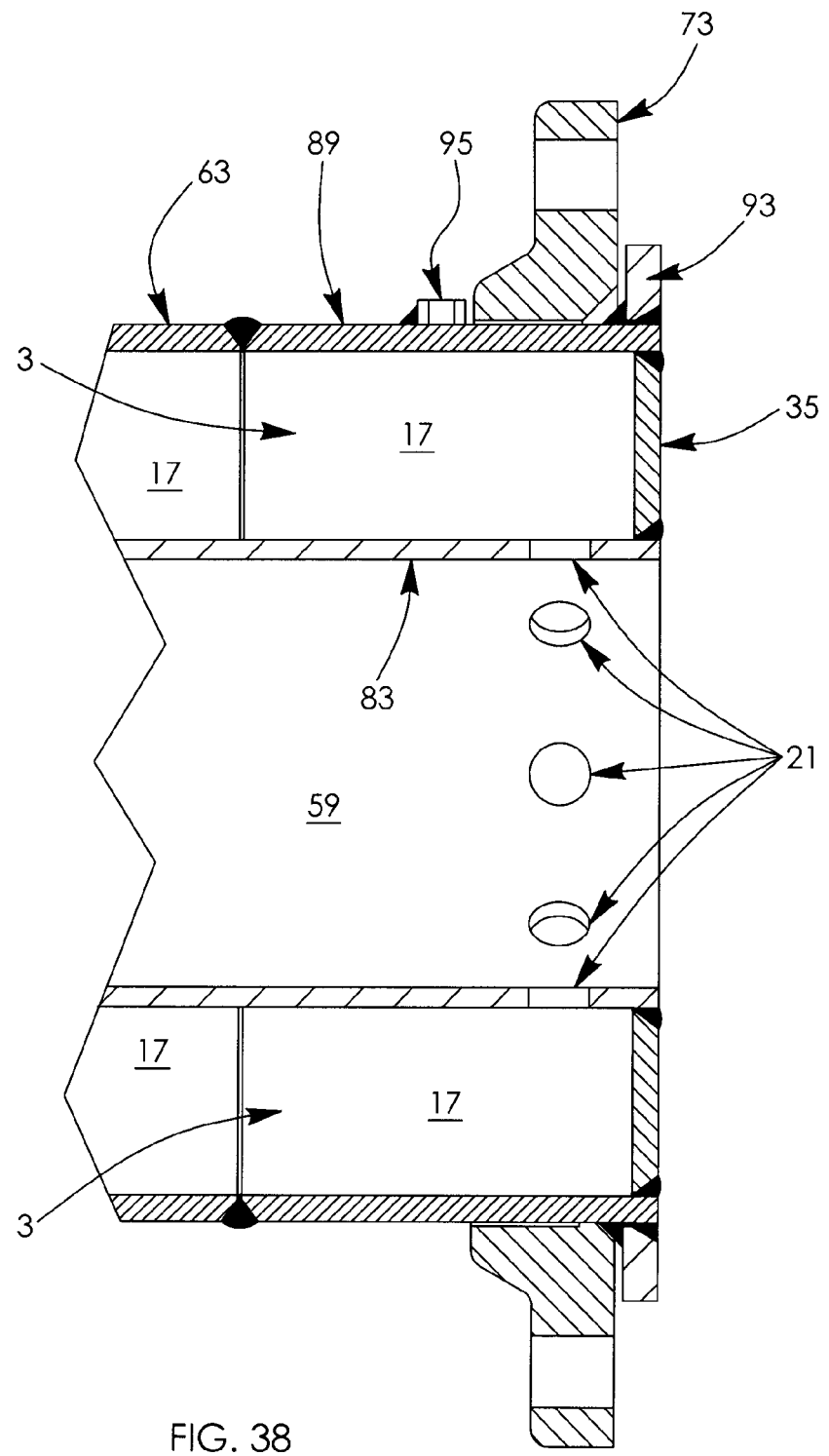
FIG. 38 is an enlarged sectional view of a rear portion of what is shown in FIG. 33.

According to one aspect of the present invention, step c) of the method could comprise the step of positioning the injection outlets (21) about the main segment (59) of the channel so that the flocculating agent (3) is injected radially towards a longitudinal axis (61) of the fluid flow (5), as exemplified in FIG. 38.

Alternatively, or additionally, step c) could also comprise the step of positioning the injection outlets (21) about an interface segment (57) of the channel so that the flocculating agent (3) is injected in a direction substantially parallel to a longitudinal axis (61) of the fluid flow (5), as exemplified in FIGS. 7, 14 and 21.

Preferably, and for improved reactive purposes, the flocculating agent (3) is injected through the plurality of injection outlets (21) into a turbulent zone created and defined adjacent to said interface segment (57), so that the flocculating agent (3) may react advantageously due to its dispersion via a plurality of injection outlets (21), which provide for an increased exposed surface area, and thus resulting improved reaction, in addition to being injected in a zone of turbulence which could also further add to the improved reaction with the mature fine tailings (9).

According to another aspect of the present invention, and as can be easily understood when referring to FIGS. 24-38, there is also provided a kit for assembling an injection device (1) for in-line injection of flocculating agent (3) into a fluid flow (5) of a pipeline (7) of mature fine tailings (9). The kit may comprise a tee joint (63) (or simply t-joint (63)), a first flange (71), a second flange (73), a third flange (75), a reducer (77) and an inner pipe (83).

Figure 22:
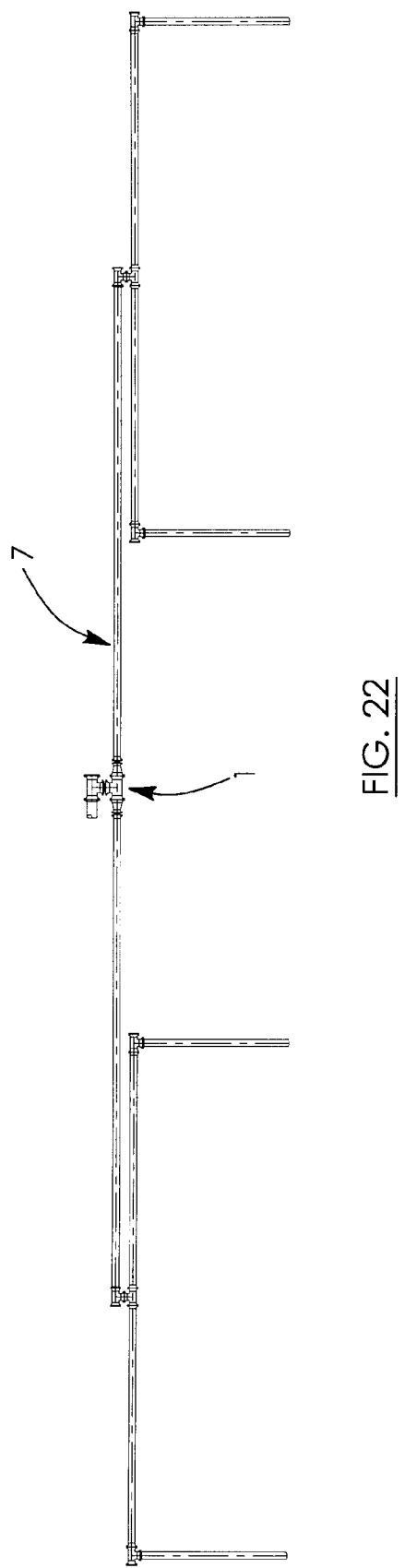
FIG. 22 is a schematic representation of a pipeline intended to be used with at least one tailings pond and being provided with an injection device according to another preferred embodiment of the present invention.
Figure 23:
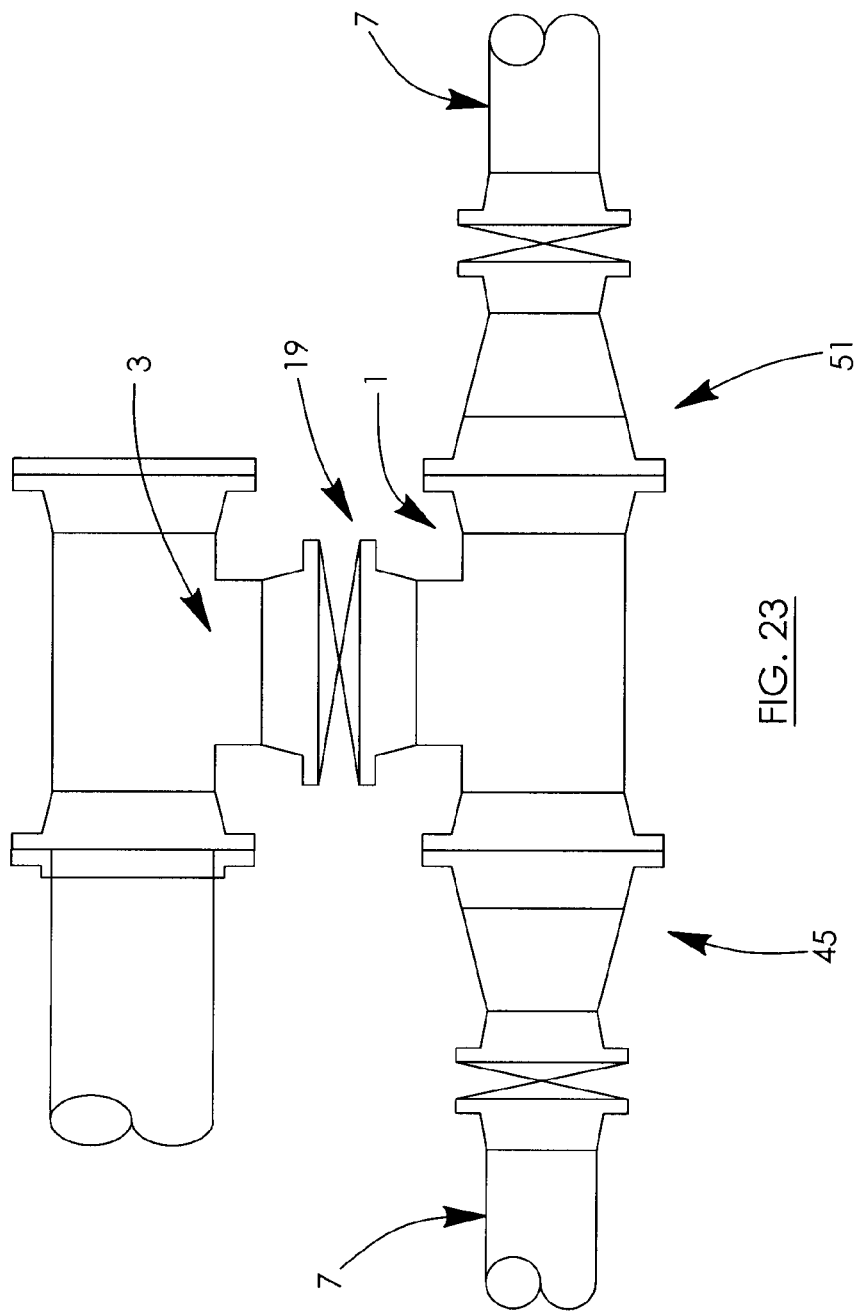
FIG. 23 is an enlarged schematic representation of a portion of what is shown in FIG. 22, including the injection device being connected in-line with a pipeline of MFT and being connected to a source of flocculated agent.
Figure 26:
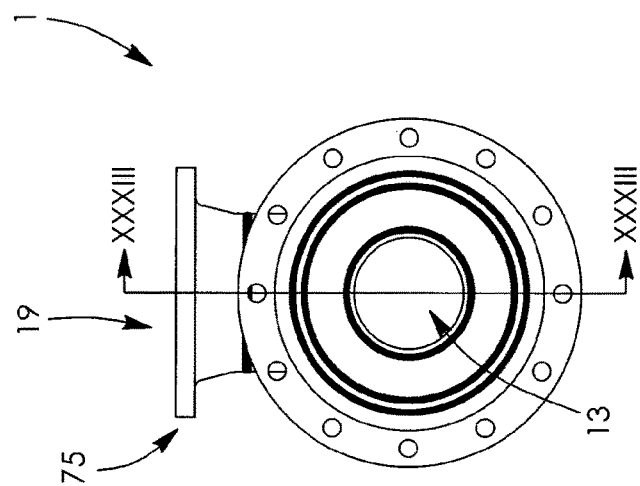
FIG. 26 is a front elevational view of what is shown in FIG. 24.
Figure 25:
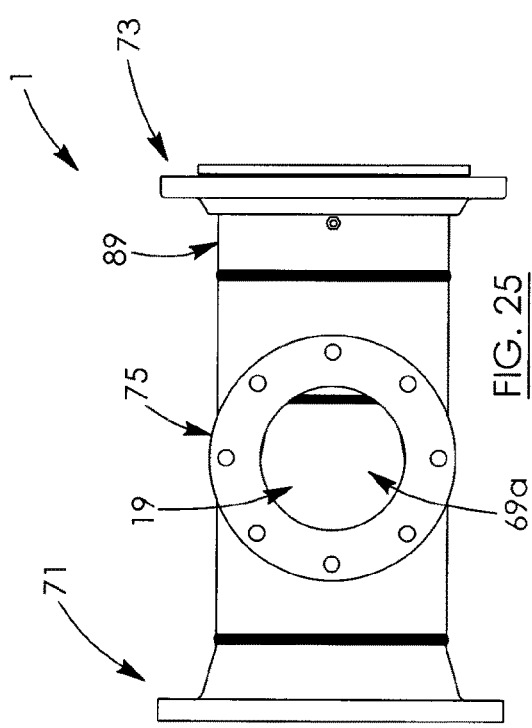
FIG. 25 is a top view of what is shown in FIG. 24.
Figure 24:
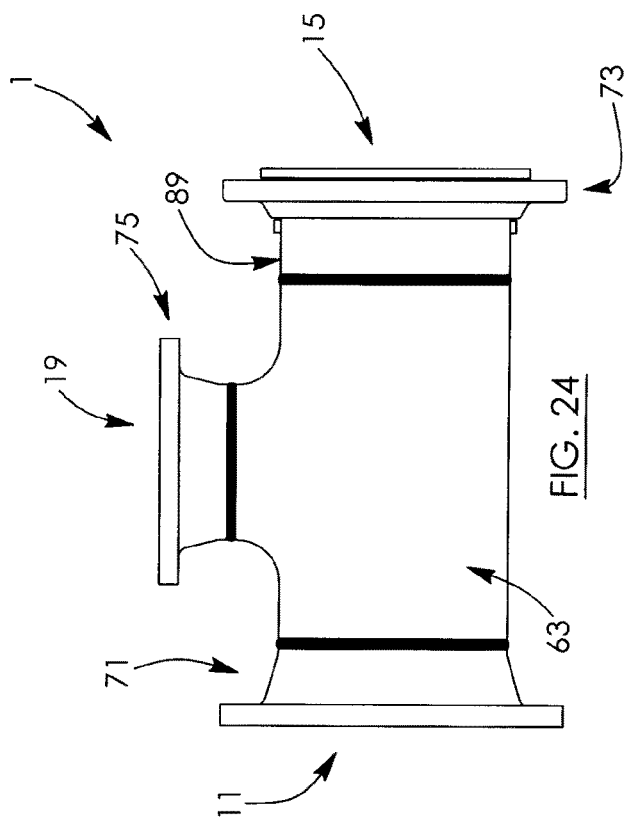
FIG. 24 is a side view of an injection device according to yet another preferred embodiment of the present invention.

Preferably, and as better shown in FIGS. 24-27, the t-joint (63) has first, second and third sections (65,67,69), each section (65,67,69) being provided with the corresponding orifice (65a,67a,69a) being fluidly connected to each other. The first flange (71) is preferably mountable about the first section (65) of the t-joint (63), and is configured for mounting the assembled injection device (1) onto a first section (45) of the pipeline (7), as exemplified in FIGS. 22 and 23. The second flange (73) is preferably mountable about the second section (67) of the t-joint (63), and is configured for mounting the assembled injection device (1) onto a second section (51) of the pipeline (7). The third flange (75) is preferably mountable about the third section (69) of the t-joint (63), and is configured for connecting the assembled injection device (1) to a source of flocculating agent (3), as represented schematically in FIG. 23.

Figure 27:
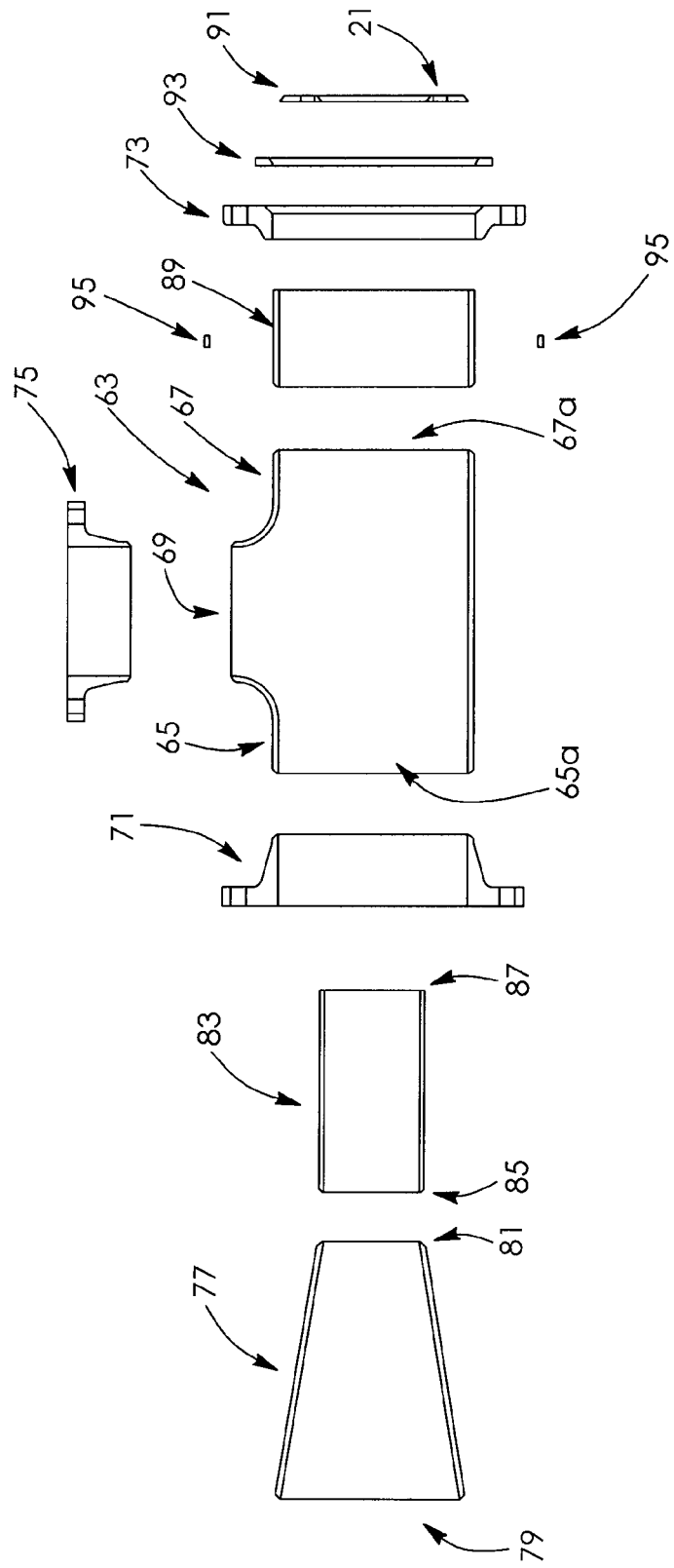
FIG. 27 is an exploded view of the components of the injection device shown in FIG. 24.
Figure 30:
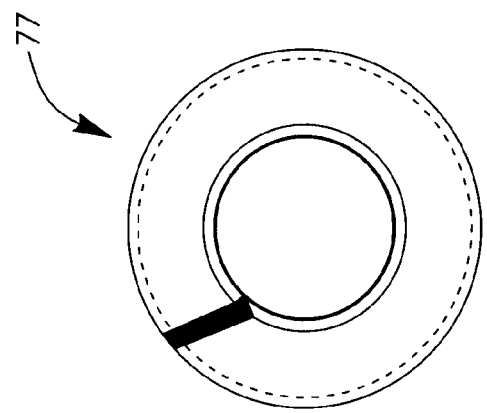
FIG. 30 is a rear view of what is shown in FIG. 28.
Figure 28:
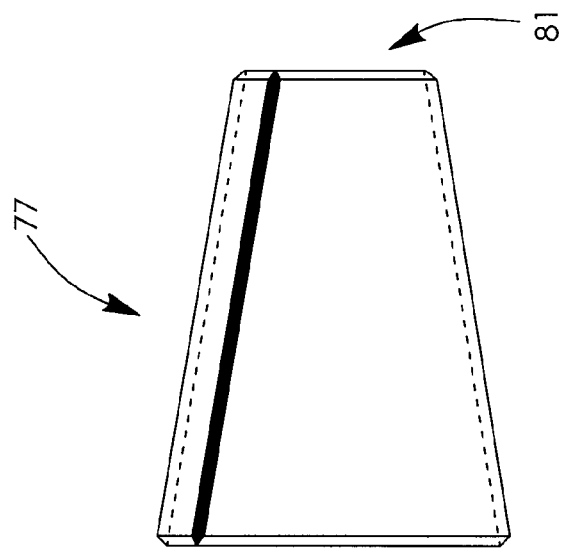
FIG. 28 is a side elevational view of a reducer according to a preferred embodiment of the present invention.
Figure 29:
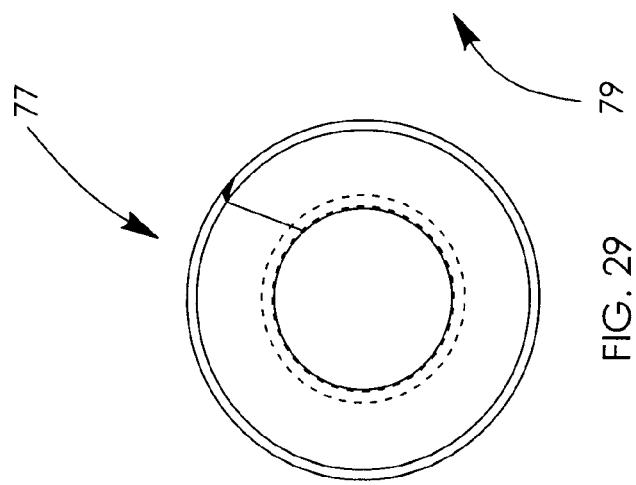
FIG. 29 is a front view of what is shown in FIG. 28.
Figure 32:
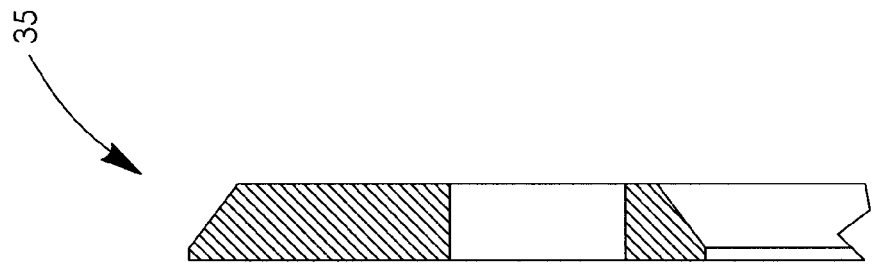
FIG. 32 is a cross-sectional view taken along line XXXII-XXXII of FIG. 31.
Figure 31:
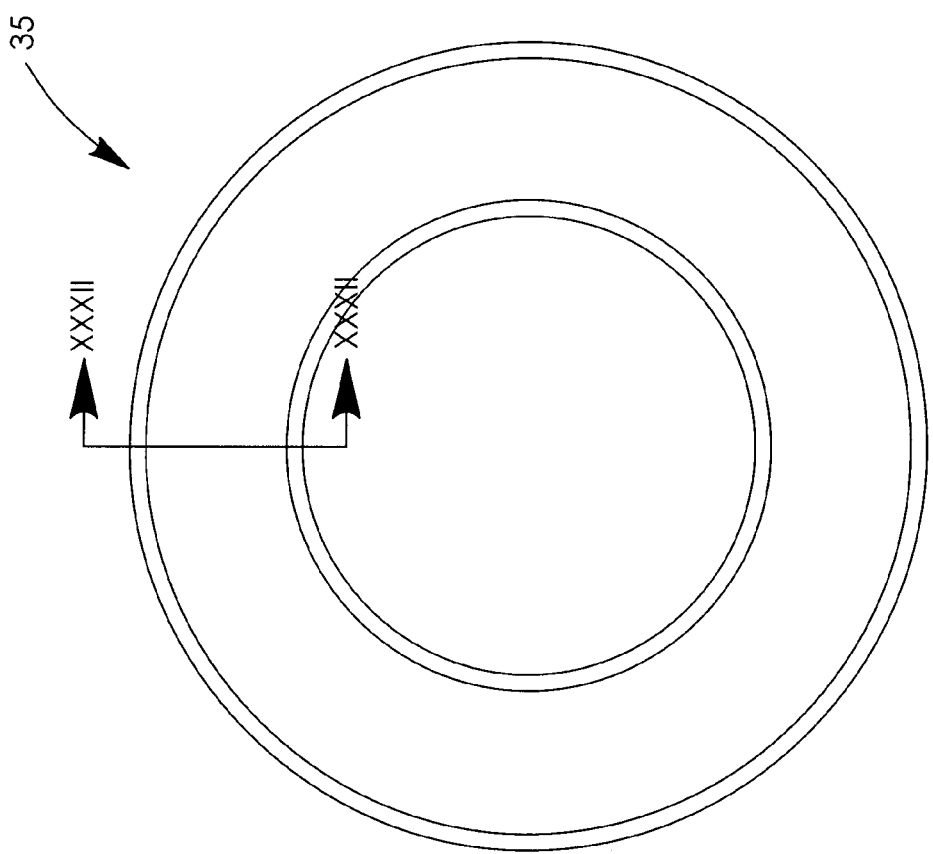
FIG. 31 is a front plan view of a ring according to a preferred embodiment of the present invention.

The reducer (77) of the kit is preferably mountable onto the first section (65) of the t-joint (63) so as to be positioned inside the t-joint (63), as better shown in FIG. 27, and the reducer (77) has an inlet (79) and an outlet (81), the inlet (79) of the reducer (77) being concentrically mountable about the orifice (65a) of the first section (65) of the t-joint (63), the cross-sectional area of the reducer (77) being reduced from its inlet (79) to its outlet (81), for obtaining corresponding resulting advantages, as briefly described hereinabove.

Referring now to FIG. 38, and as can be easily understood, the inner pipe (83) is preferably mountable onto the second section (67) of the t-joint (63) so as to be positioned inside the t-joint (63), the inner pipe (83) having an inlet (85) and an outlet (87), the inlet (85) of the inner pipe (83) being connectable to the outlet (81) of the reducer (77), the outlet (87) of the inner pipe (83) being concentrically mountable about the orifice (67a) of the second section (67) of the t-joint (63), the inner pipe (83) being cooperable with the second section (67) of the t-joint (63) for defining a plurality of injection outlets (21) about the outlet (87) of the inner pipe (83) so that flocculating agent (3) coming from the third section (69) of the t-joint (63) be injected in a dispersed manner through said injection outlets (21) and into the fluid flow (5) of mature fine tailings (9) travelling through the reducer (77) and the inner pipe (83). As previously explained, and according to a preferred aspect of the present invention, the injection outlets (21) may be provided about different suitable locations within the injection device (1), whether it be directly about the inner pipe (83), or provided about a corresponding ring (35).

According to a given preferred embodiment, the second section (67) of the t-joint (63) preferably includes an outer pipe (89) positionable concentrically about the inner pipe (83) for defining a conduit (17) therebetween destined to receive the flocculated agent (3), as can be easily understood when referring to FIGS. 33 and 38. Preferably also, the second flange (73) is mountable onto the outer pipe (89), and the kit further comprises a backing ring (35,91) mountable between the inner pipe (83) and the outer pipe (89). The backing ring (91) may be provided with injection outlets (21) for receiving flocculating agent (3) from the second section (67) of the t-joint (63), and for injecting the flocculated agent (3) into the fluid flow (5) in a dispersed manner, as can be easily understood when referring to the preferred embodiments of the present invention illustrated in FIGS. 1-21.

According to another aspect, the kit may also comprise a lap ring (93) mountable onto the second flange (73), as well as a nut (95) mountable onto the second flange (73), and as can be easily understood when referring to FIGS. 27, 33 and 38, the components of the kit operatively secured onto one another in a suitable manner, and preferably, by an appropriate assembling or connecting method, such by welding, for example.

It is worth mentioning that various other suitable injection devices (1) may be provided for carrying out the injection method according to the present invention. For example, when referring to FIGS. 39-43, there is shown how according to a given preferred embodiment, the injection device (1) according to the present invention may also be provided in a form of an injection device (1) for use with a lateral pipe fitting (97) of a pipeline (7) of mature fine tailings (9), the lateral pipe fitting (97) having a substantially y-joint arrangement including a main line (99) along which a fluid flow (5) of mature fine tailings (9) is intended to travel, and a corresponding branch line (101). The injection device (1) may comprise an abutment flange (103) for abutting against a distal end (105) of the branch line (101). The injection device (1) may also comprise a supporting body (107) projecting from the abutment flange (103) inwardly towards the main line (99), the supporting body (107) having an internal conduit (109) for conveying flocculated agent (3) to be introduced into the fluid flow (5) via a corresponding distal extremity (111) (or "end portion") intersecting the fluid flow (5) of mature fine tailings (9). The injection device (1) also preferably comprises a plurality of injection outlets (21) provided on the distal extremity (111) (i.e. "end portion") of the supporting body (107), and through which flocculated agent (3) is injected, the injection outlets (21) being shaped and sized, and each having an orifice substantially smaller than that of the internal conduit (109) so as to increase dispersion of the flocculating agent (3) about the injection outlets (21) in order to improve mixing of the fluid flow (5) with said flocculating agent (3) via an increased exposed surface area of the flocculating agent (3) provided by the plurality of injection outlets (21).

Figure 39:
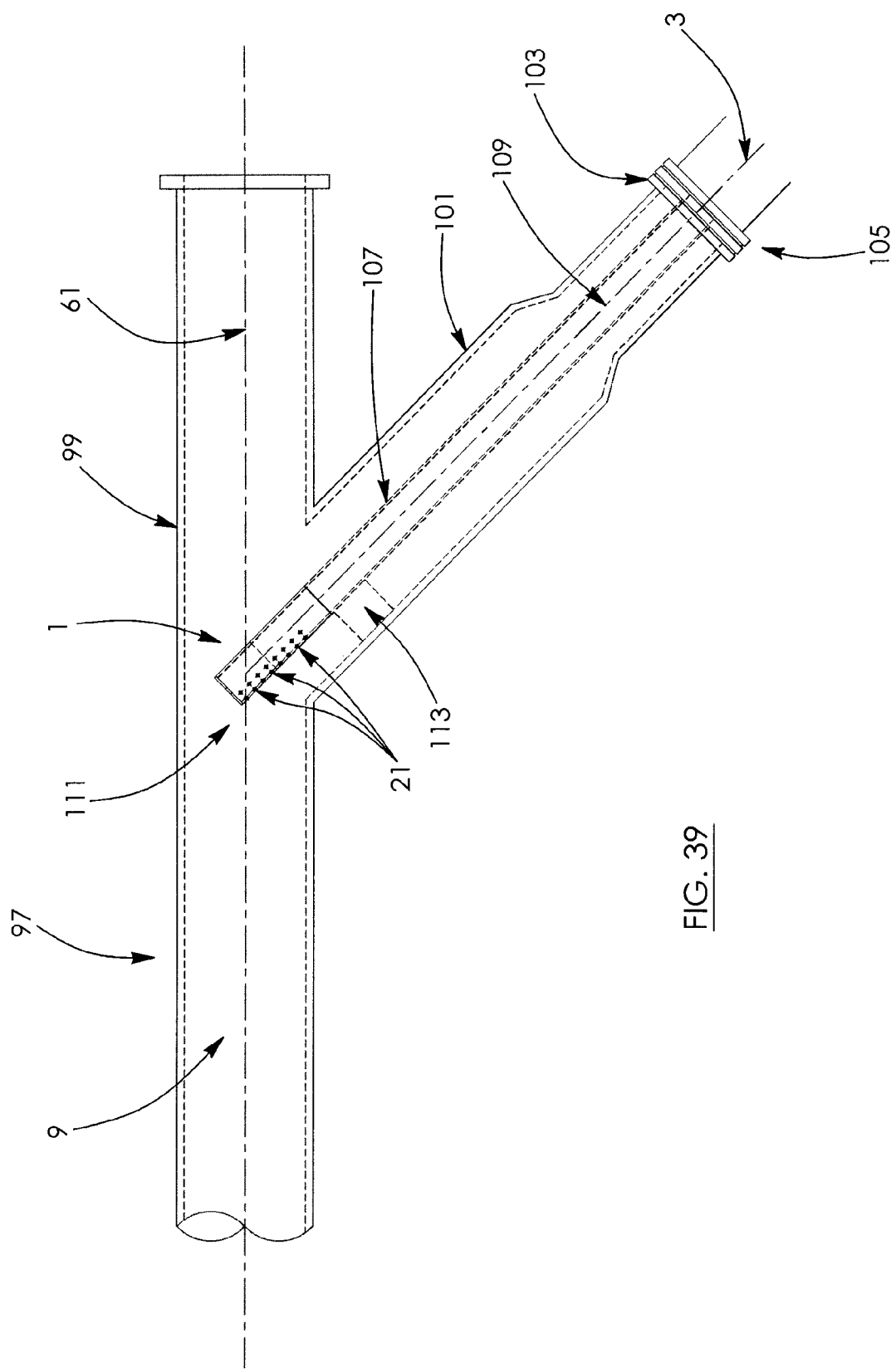
FIG. 39 is a branch fitting of a pipeline carrying mature fine tailings and being provided with an injection device according to another preferred embodiment of the present invention.

According to a first preferred embodiment, as better shown in FIG. 39, the supporting body (107) of the injection device (1) is configured so that its distal extremity (111) is positioned about a main longitudinal axis (61) of the fluid flow (5), and so that injection outlets (21) are positioned substantially below said longitudinal axis (61).

Figure 40:
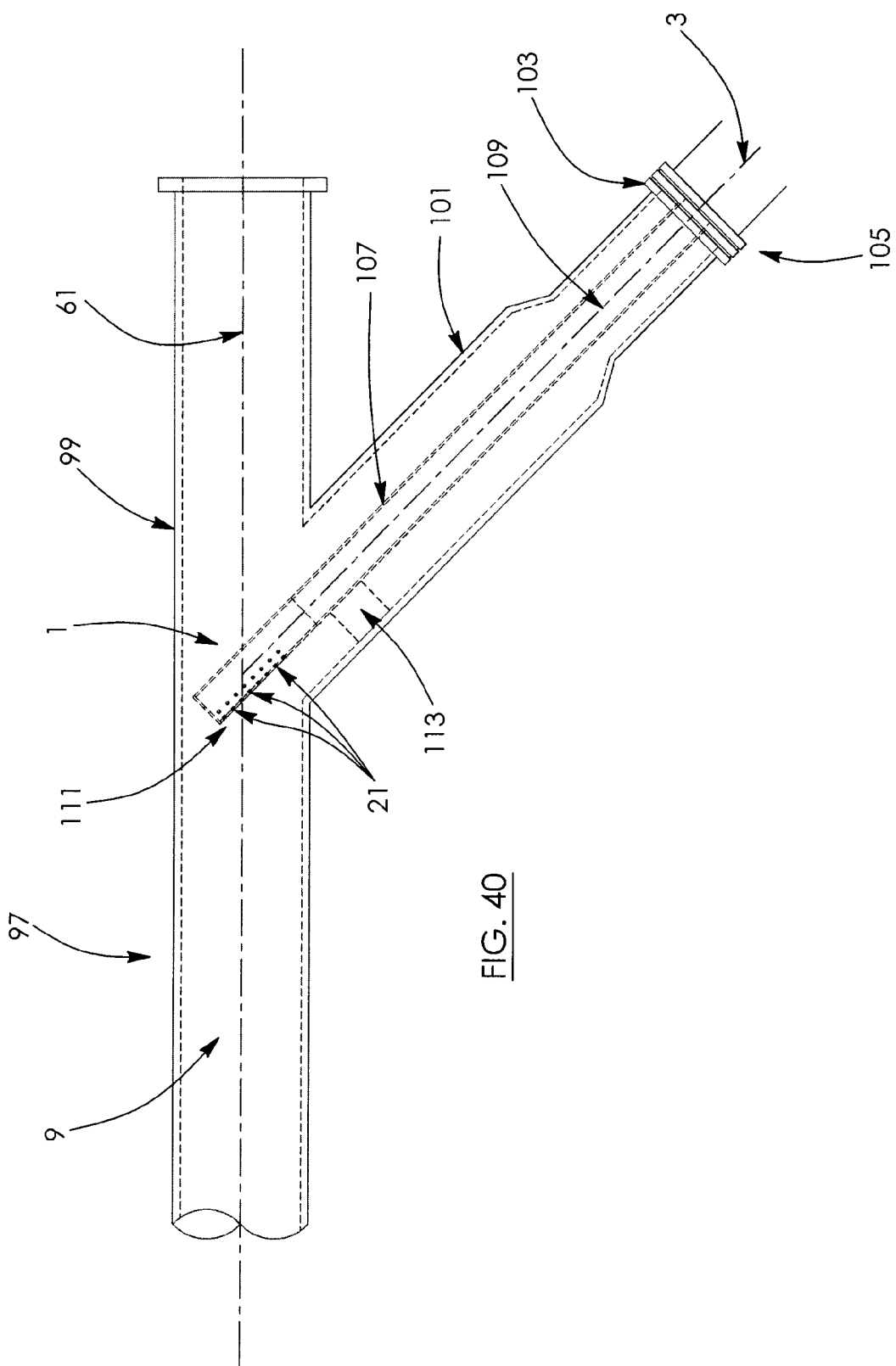
FIG. 40 is a branch fitting of a pipeline carrying mature fine tailings and being provided with an injection device according to yet another preferred embodiment of the present invention.
Figure 41:
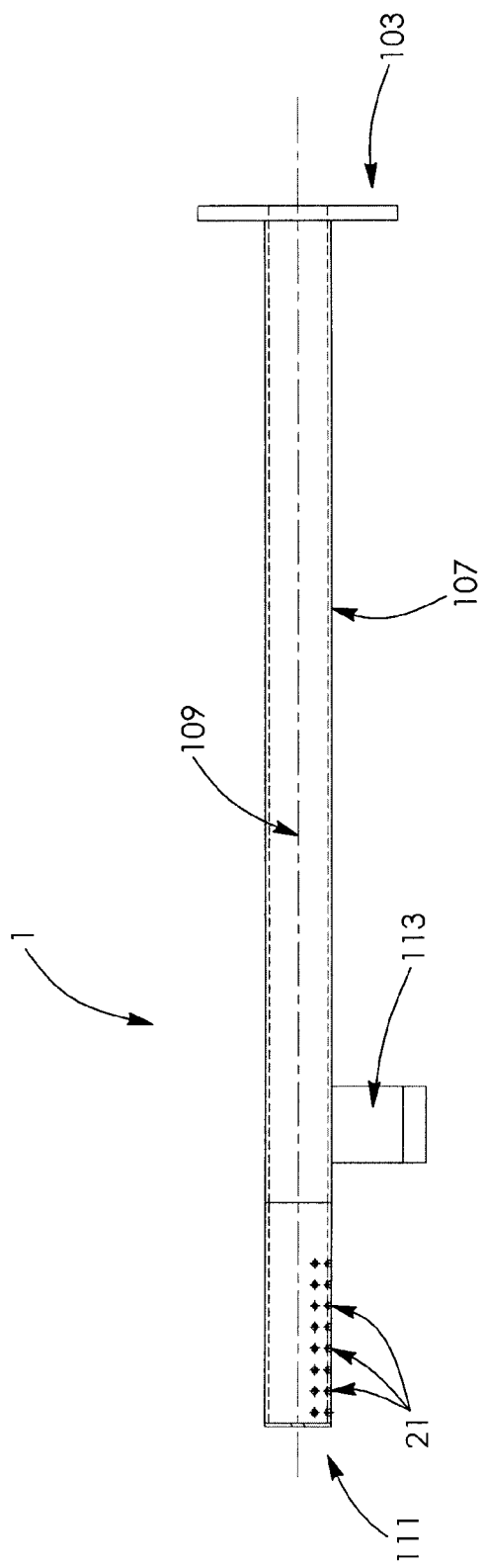
FIG. 41 is a side view of the injection device shown in FIG. 40.

According to another preferred embodiment, as better shown in FIG. 40, the supporting body (107) of the injection device (1) is configured so that its distal extremity (111) is positioned above a main longitudinal axis (61) of the fluid flow (5), and so that injection outlets (21) are substantially positioned about said longitudinal axis (61).

Figure 42:
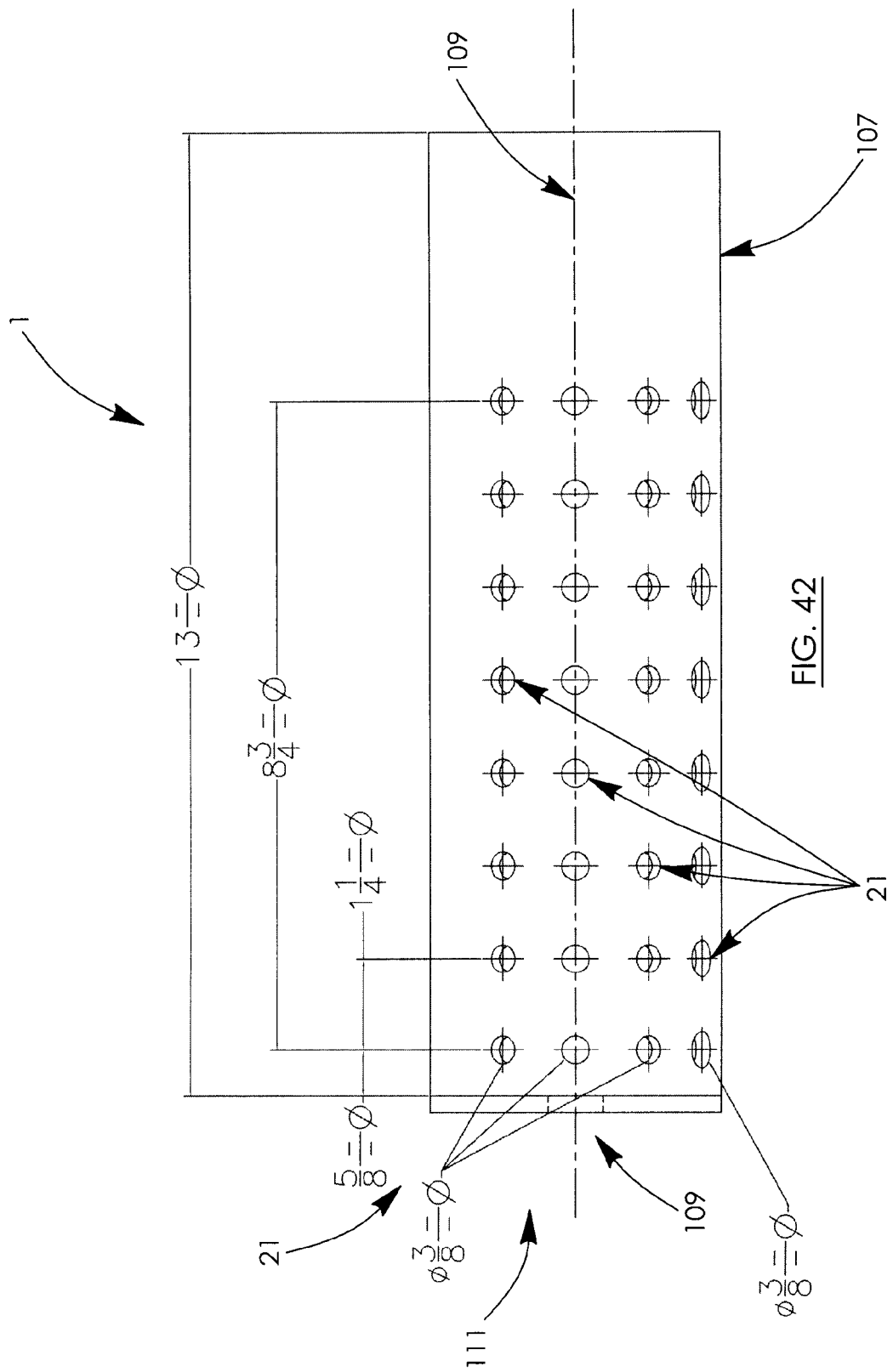
FIG. 42 is an enlarged view of a distal front portion of the injection device of FIG. 41.
Figure 43:
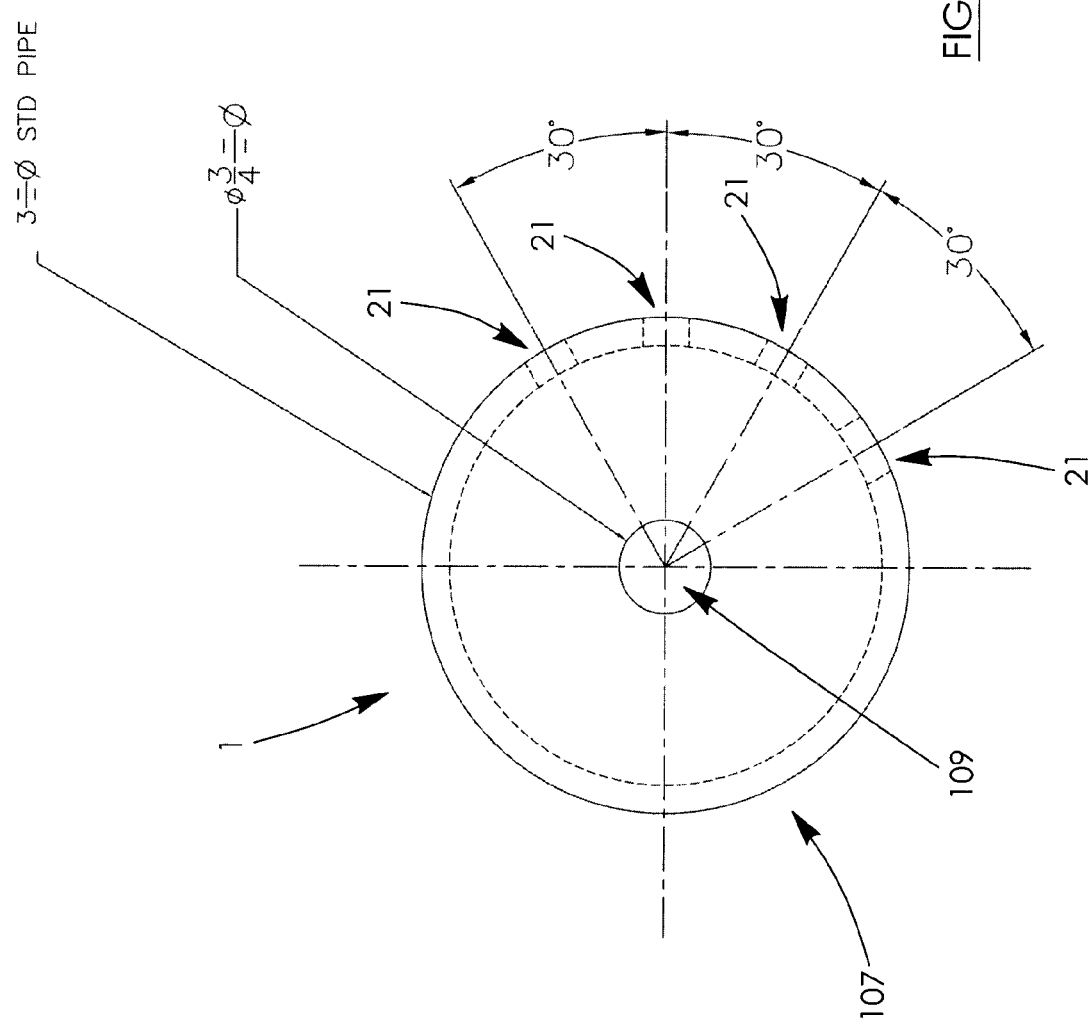
FIG. 43 is a sectional view of a portion of what is shown in FIG. 42.

The supporting body (107) may simply be a cylinder or a pipe, and according to a given embodiment, as better shown in FIGS. 42 and 43, the injection outlets (21) are disposed about the supporting body (107) along four rows of injection outlets (21), with about 30 degrees of radial separation between each row of injection outlets (21), and most of the injection outlets (21) being about ⅜ inches in diameter. Preferably also, the internal conduit (109) of the supporting body (107) is about ¾ inches in diameter. Once again, it is worth mentioning, as can also be easily understood by a person skilled in the art, that an important aspect of the present invention resides in the manner in which the flocculated agent (3) is introduced or "dispersed" within the fluid flow (5) of the mature fine tailings (9) for increasing a proper reaction, thus, the number of injection holes (21), the cross-sectional configuration thereof, the number of rows of said injections holes (21), the positioning with respect to the main channel (13) or internal conduit (109), and other considerations, may be changed, altered and/or modified, depending on the particular applications for which the injection device (1) is intended for, the type of fluid flow (5) with which it is used, and the desired end results.

The supporting body (107) is preferably provided with a stabilizer (113) for resting against an inner wall of the branch line (101), which enables namely to maintain the distal extremity (111) of the injection device (1) substantially fixed with respect to the fluid flow (5), thereby minimizing vibrations to said distal extremity (111), etc., as can be easily understood by a person skilled in the art.

Finally, and according to the present invention, the injecting device (1) and corresponding parts are preferably made of substantially rigid materials, such as metallic materials (stainless steel, etc.), hardened polymers, composite materials, and/or the like, whereas other components thereof according to the present invention, in order to achieve the resulting advantages briefly discussed herein, may preferably be made of a suitably malleable and resilient material, such as a polymeric material (plastic, rubber, etc.), and/or the like, depending on the particular applications for which the injecting device (1) and resulting pipeline (1) or closed circuit are intended for and the different parameters in cause, as apparent to a person skilled in the art.

Furthermore, the present invention is a substantial improvement over the prior art in that, by virtue of its design and components, the device (1) is simple and easy to use, as well as is simple and easy to manufacture and/or assemble, and provides for a much more efficient and cost effective manner of processing MFT.

Indeed, as may now be better appreciated, the present invention is substantially advantageous over conventional techniques in that it allows for a much faster and more efficient mixing of liquid polymer with the mature fine tailings (MFT), namely due to the fact that the flocculating agent (for example, liquid polymer) is introduced into the fluid flow of mature fine tailings in a dispersed manner via a plurality of injection outlets. This enables namely a lower polymer usage for the same quantity of MFT as compared to an un-optimized design. Moreover, this enables for increased process efficiency.

The present invention is also advantageous in that it allows for very low maintenance on a device and fabrication can be completed in-house, with straightforward "off-the-shelf" components, as briefly explained hereinabove.

As may also now be better appreciated, the solution proposed with the present invention is also advantageous in that it introduces liquid polymer into the MFT at a higher velocity through multiple openings, thus increasing the exposed surface area of the liquid polymer. In contrast, conventional techniques minimize exposed surface area of the polymer which leaves a large amount of polymer unmixed, with associated drawbacks and inconveniences. It is worth mentioning also that according to the present invention, the design of the injection spool also promotes a turbulent zone near the point of injection which aids in rapidly mixing the dispersed polymer. Thus, there is an increased contact area between the polymer and the MFT at the injection point. Moreover, and as explained earlier, the design of the injector spool promotes a turbulent zone at the area of injection which promotes rapid mixing of MFT and polymer. Typically, with an inefficient injection device, excess polymer is added to compensate for the poor injection, whereas the present new and innovative design enables to make up for the inefficiency and polymer usage can be minimized.

Indeed, an important aspect of the present invention resides in that instead of polymer injection into the MFT stream via a large opening, as is normally done in the prior art, polymer injection is done through multiple holes of smaller diameter achieving the same or even greater overall injection velocity but significantly increasing the exposed polymer surface area, for an improved reactive process and improved end results.

As previously explained, and according to one preferred embodiment of the present invention, the present injection device reduces the 12 inch MFT flow down to a 6 inch flow through a concentric reducer. The flow is then dramatically expanded from 6 inches back to 12 inches creating a turbulent zone. This zone is the location where preferably polymer injection holes are provided, for the injection of the liquid polymer. This provides adequate contact area for the polymer while also providing extra mixing of the two fluids. In the present case, mixing takes place directly at the injection point which is positioned and placed accordingly, for optimal results. Because the injection of the polymer is optimized, the mixture subsequently enters the drying cell with the greatest potential for immediate water release and optimal drying times, two process requirements for MFT drying.

It is worth mentioning also that fabrication of the present injection device (1) is fairly simple to carry out, in that, according to a preferred embodiment, it may simply involve a standard t-fitting with standard steel parts inside of minimal complexity. Therefore, it can economically be fabricated, with relatively readily available off-the-shelf components. Furthermore, the present invention is also advantageous in that the maintenance of the injection device (1) is fairly minimal as the component is essentially run to failure with surface wear being the failure mechanism. Because the service is MFT, the wear rates are much lower than with coarse tailings.

Various other variations or alternatives of the present invention could be made, as apparent to a person skilled in the art. For example, it has been explained that once the injection location is chosen, the device (1) can be installed in-line with standard flange connections. This is typically done on a 12 inch MFT pipeline. The polymer inlet is thus typically 8 inch and can also be connected to the device via a standard 8 inch flange inlet. However, it is worth mentioning that various other barometers or design variables could be considered for the present invention in that for example, one of them could be the reduction of the internal pipe from 6 inch to 4 inch. Indeed, the subsequent turbulent zone becomes larger and it is thought that this can aid in mixing during times where the feed density dictates such a change. It is also worth mentioning that standard flange connections provide for easy installation, and that for particular applications, expansion from 6 inch internal diameter to 12 inch provides a turbulent zone whereby extra mixing is induced into the injection area.

Moreover, it is worth mentioning also, that although the main outlet (15) of the present injection device (1) has been exemplified in the accompanying drawings as being substantially "vertical", such an outlet (15) may deviate from a vertical plane, at a given angle, for example, within a range of about 10 degrees relative to the horizontal up to vertical. Indeed, a person skilled in the art may appreciate that while mechanical construction of the vertical unit is easier, an appropriate angle of the outlet (15) promotes some recovery of the pressure while mixing the fluids. Therefore, one can view the injection orifices (21) shown in FIG. 33 as being a 0-degree case. Furthermore, a person skilled in the art will also understand that the fact of having sharp-edged or rounded-edged injection orifices (21) will affect the flow rate through the nozzle. Sharp edges are easiest to drill, while tapered or rounded edges provide better flow capacity. Thus, in addition to the various changes that could be made to the present injection device (1), not only the shape and the positioning of the injection outlets (21) can be varied depending on different application(s) for which the injection device (1) is intended for, and the desired end result(s), but it is important to note also that the injection outlets (21) are not necessarily limited to "round" configurations or cross-sections, although they are easier to manufacture by simple drilling, punching, and the like, and that these very same injection outlets (21) or orifices can be made to take on various other suitable geometric configurations, and cross-sectional shapes, such as "star-like" configurations, for example, so as to further increase the exposed surface area (or "wetted perimeter") of the flocculating agent (3) introduced into the fluid flow (5) by means of said injection outlets (21), as also apparent to a person skilled in the art.

Of course, numerous other modifications could be made to the above-described embodiments without departing from the scope of the invention, as defined in the appended claims.

What is claimed:

1. A method of inline-injection of a flocculating agent into fine tailings flowing through a pipeline in order to promote flocculation of the fine tailings, the method comprising:
   providing a fluid flow of the fine tailings to be treated along a channel fluidly connected to the pipeline;
   providing a source of the flocculating agent; and
   introducing the flocculating agent inside the fluid flow of the fine tailings via a plurality of injection outlets disposed co-annularly about the fluid flow of the fine tailings and each having an orifice smaller than the channel, thereby dispersing the flocculating agent into the fluid flow for flocculating the fine tailings.

2. The method of claim 1, wherein the introducing of the flocculant solution further comprises:
   creating a zone of turbulence within the fluid flow of the fine tailings; and
   injecting the flocculating agent via the plurality of injection outlets within the zone of turbulence for mixing the flocculating agent with the fine tailings and further promoting flocculation of the fine tailings.

3. The method of claim 1, wherein the flocculating agent is introduced into the fluid flow of the fine tailings as part of a liquid.

4. The method of claim 1, wherein the flocculating agent is injected into the flow of the fine tailings via an injection device that is fluidly coupled to the source of the flocculating agent and the pipeline, the injection device comprising:
   a main inlet for receiving the fluid flow of the fine tailings;
   the channel coupled to the main inlet and along which the fluid flow entering the inlet is allowed to travel;
   a main outlet for releasing the fluid flow; and
   a complementary conduit, disposed co-annularly with respect to the channel, and configured for receiving the flocculating agent from a feed inlet different from the main inlet, the complementary conduit having the plurality of injection outlets disposed co-annularly about the main outlet for injecting the flocculant solution into the fluid flow exiting the main outlet.

5. The method of claim 4, wherein the injection outlets are radially positioned about the main outlet in an equally spaced manner.

6. The method of claim 4, wherein the injection device comprises eight injection outlets, wherein each injection outlet is about ⅞ inches in diameter, and wherein a center point for each injection outlet is positioned about ⅞ inches away from an inner surface of the channel.

7. The method of claim 4, wherein the orifice of each injection outlet is substantially smaller than that of the feed inlet.

8. The method of claim 4, wherein the orifice of each injection outlet is substantially smaller than that of the channel.

9. The method of claim 4 wherein the channel has an internal diameter which is smaller than an internal diameter of the pipeline.

10. The method of claim 9, wherein the channel has an internal diameter which is about half the size of an internal diameter of the pipeline.

11. The method of claim 9, wherein the internal diameter of the channel is between about 4 inches and about 6 inches.

12. The method of claim 4, wherein the feed inlet is provided with a connecting flange for removably connecting the feed inlet to the source of the flocculant solution.

13. The method of claim 4, wherein the injection outlets each comprise rounded edges.

14. The method of claim 4, wherein each injection outlet comprises a cylindrical conduit that has a longitudinal outlet axis oriented in parallel with respect to a longitudinal axis of the channel, and each injection outlet has a constant circular cross-section along the longitudinal outlet axis.

15. The method of claim 4, wherein the injection outlets are disposed cross-sectionally adjacent to and co-annularly about the main outlet.

16. The method of claim 4, wherein the injection device further comprises a backing ring defining a downstream end of the complementary conduit and having the injection outlets extending there-through, the backing ring comprising a downstream-facing annular surface at which each of the injection outlets terminates, and wherein the injection outlets are provided extending through a wall thickness of the backing ring.

17. The method of claim 16, wherein the backing ring has disposed there-through a single circular pattern of the injection outlets.

18. The method of claim 4, wherein the main inlet comprises a tapered reducer concentrically mounted about an upstream inlet of the channel, the cross-sectional area of the reducer being reduced in a downstream direction of the fluid flow.

19. The method of claim 18, wherein the tapered reducer has a slope with a ratio of about 7 to 1.

20. The method of claim 4, wherein the injection outlets are located closer to an inner wall of the channel than to an outer wall of the complementary conduit.

21. The method of claim 1, further comprising rapidly increasing the cross-sectional area of the channel along a given interface segment of the channel for abruptly altering the flow velocity of the fine tailings travelling through the interface segment of the channel, in order to create a turbulent zone of fluid flow adjacent to the interface segment.

22. The method of claim 1, wherein the fine tailings are derived from oil sands.

23. The method of claim 22, wherein the fine tailings are mature fine tailings.

24. A method of inline-injection of a liquid comprising a polymer flocculating agent into fine tailings flowing through a pipeline in order to promote flocculation of the fine tailings, the method comprising:
    providing a fluid flow of the fine tailings to be treated along a channel fluidly connected to an upstream section of the pipeline and a downstream section of the pipeline;
    introducing the liquid comprising the polymer flocculating agent into the fluid flow of the fine tailings in the form of a plurality of liquid streams that enter the fluid flow in a downstream direction and at respective locations arranged annularly about the channel such that the flocculating agent mixes with the fine tailings and forms flocculated tailings, wherein the liquid streams each have a cross-sectional area upon entry into the fine tailings that is smaller than the cross-sectional area of the channel; and
    flowing the flocculated tailings through the downstream section of the pipeline.

25. A method of inline-injection of a liquid comprising a polymer flocculating agent into fine tailings flowing through a pipeline in order to promote flocculation of the fine tailings, the method comprising:
    providing a fluid flow of the fine tailings to be treated along a channel fluidly connected to the pipeline;
    introducing the liquid comprising the polymer flocculating agent into the fluid flow of the fine tailings via an injection device comprising:
        a main inlet for receiving the fluid flow;
        a main channel along which the fluid flow entering the inlet is allowed to travel;
        a main outlet located at a downstream end of the main channel for releasing the fluid flow into a mixing zone;
        a complementary conduit, disposed co-annularly with respect to the main channel, and configured for receiving the liquid comprising the polymer flocculating agent from a feed inlet different from the main inlet, the complementary conduit having a plurality of injection outlets disposed cross-sectionally adjacent to and co-annularly about the main outlet for injecting flocculating agent into the fluid flow exiting the main outlet into the mixing zone, the injection outlets being shaped and sized, and each having an orifice substantially smaller than that of the main outlet so as to increase dispersion of the flocculating agent about the main outlet in order to improve mixing of the fluid flow with said flocculating agent via an increased exposed surface area of the flocculating agent.

* * * * *